United States Patent
Hashimoto et al.

(10) Patent No.: US 10,622,872 B2
(45) Date of Patent: Apr. 14, 2020

(54) CONDUCTOR SHAPING APPARATUS AND METHOD

(71) Applicants: AISIN AW CO., LTD., Anjo-shi, Aichi-ken (JP); TOYOTA JIDOSHA KABUSHIKI KAISHA, Toyota-shi, Aichi-ken (JP)

(72) Inventors: Shingo Hashimoto, Okazaki (JP); Katsuya Ito, Nagoya (JP); Takanori Ota, Anjo (JP); Daisuke Matsuo, Okazaki (JP); Mizuki Igarashi, Anjo (JP); Norihiko Akao, Nissin (JP); Hirotaka Kawaura, Toyota (JP); Hisayuki Kobayashi, Toyota (JP); Hiroharu Sugiura, Toyota (JP)

(73) Assignees: AISIN AW CO., LTD., Anjo (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 530 days.

(21) Appl. No.: 15/027,854

(22) PCT Filed: Nov. 13, 2014

(86) PCT No.: PCT/JP2014/080088
§ 371 (c)(1),
(2) Date: Apr. 7, 2016

(87) PCT Pub. No.: WO2015/076179
PCT Pub. Date: May 28, 2015

(65) Prior Publication Data
US 2016/0248306 A1 Aug. 25, 2016

(30) Foreign Application Priority Data
Nov. 20, 2013 (JP) .................................. 2013-240267

(51) Int. Cl.
*H02K 15/04* (2006.01)
*B21F 1/00* (2006.01)
*H02K 3/28* (2006.01)

(52) U.S. Cl.
CPC ............. *H02K 15/04* (2013.01); *B21F 1/004* (2013.01); *H02K 3/28* (2013.01)

(58) Field of Classification Search
CPC ...... H02K 15/0087; H02K 15/04; H02K 3/28; H01F 41/10; B21F 1/004; B21F 35/02;
(Continued)

(56) References Cited

U.S. PATENT DOCUMENTS 300,159 A * 6/1884 Stokes ................... B21D 13/02
72/399
2,869,612 A * 1/1959 Bertram .................... B21F 1/00
140/80
(Continued)

FOREIGN PATENT DOCUMENTS

DE 102006013712 A1 2/2007
DE 102010016197 A1 4/2011
(Continued)

OTHER PUBLICATIONS

Machine Translation of JP 2003-031747, 7 Pages.*
(Continued)

*Primary Examiner* — Gregory D Swiatocha
(74) *Attorney, Agent, or Firm* — Oliff PLC

(57) ABSTRACT

A conductor shaping apparatus with first and second shaping dies that are movable toward and away from each other along a first direction, and that are moved toward each other to shape the at least one first bent portion and the at least one second bent portion, wherein one of the first and second shaping dies is configured to be moved away from the other along a second direction that is different from the first
(Continued)

direction such that the conductor is not dragged when the first and second shaping dies are moved away from each other along the first direction after shaping of the first and second bent portions is completed.

21 Claims, 15 Drawing Sheets

(58) Field of Classification Search
CPC ... B21D 13/02; B21D 13/10; Y10T 29/49009; Y10T 29/53161
See application file for complete search history.

(56) References Cited

U.S. PATENT DOCUMENTS

| | | |
|---|---|---|
| 5,613,529 A | 3/1997 | Tanaka et al. |
| 2007/0022596 A1 | 2/2007 | Nishimura et al. |
| 2010/0170317 A1 | 7/2010 | Saito et al. |
| 2010/0242277 A1 | 9/2010 | Akimoto et al. |
| 2010/0252139 A1 | 10/2010 | Akimoto et al. |
| 2011/0277314 A1 | 11/2011 | Okushita et al. |
| 2013/0019463 A1 | 1/2013 | Guercioni |

FOREIGN PATENT DOCUMENTS

| | | | |
|---|---|---|---|
| DE | 112009002299 B4 | | 9/2015 |
| JP | 2002-064028 A | | 2/2002 |
| JP | 200264028 A | * | 2/2002 |
| JP | 2003-031747 A | | 1/2003 |
| JP | 200331747 A | * | 1/2003 |
| JP | 2004-297863 A | | 10/2004 |
| JP | 2010-110122 A | | 5/2010 |
| JP | 2010-246283 A | | 10/2010 |
| JP | 2012-164551 A | | 8/2012 |
| JP | 2012-239371 A | | 12/2012 |
| JP | 2012239371 A | * | 12/2012 |
| JP | 2013-005541 A | | 1/2013 |
| WO | 2013/046316 A1 | | 4/2013 |

OTHER PUBLICATIONS

Machine Translation of JP 2012-239371, 18 Pages.*
Machine Translation of JP 2002-064028, 8 Pages.*
Jan. 20, 2015 International Search Report issued in International Patent Application No. PCT/JP2014/080088.

* cited by examiner

CONDUCTOR SHAPING APPARATUS AND METHOD

BACKGROUND

The present disclosure relates to a conductor shaping apparatus and method for shaping a first bent portion and a second bent portion in which a conductor is bent in a first bend direction and a second bend direction that is orthogonal to the first bend direction, respectively.

There has hitherto been known a coil that constitutes a stator of a rotary electric machine, the coil being formed by winding a wire material (rectangular wire) with a rectangular cross section and having a lead wire portion (conductor) provided at one end (see Japanese Patent Application Publication No. 2010-110122, for example). The coil is mounted to a stator core via an insulating member, and an end portion of the conductor is electrically connected to an end portion of another corresponding coil on the side opposite to a lead wire portion. There is also known a coil for a rotary electric machine, the coil being formed by inserting a segment, which is a generally U-shaped conductor, into a slot formed in a stator core or a rotor core, and sequentially joining, such as welding, end portions of segments to each other on one end side of the core (see Japanese Patent Application Publication No, 2004-297863, for example). The coil is formed by bending a rectangular wire in the flatwise direction (direction that is generally orthogonal to the long side of the cross section) and the edgewise direction (direction that is generally orthogonal to the short side of the cross section), which is orthogonal to the flatwise direction, using a plurality of dies, rollers, etc.

SUMMARY

Also in the rotary electric machine described in Japanese Patent Application Publication No. 2010-110122 mentioned above, it is preferable to bend the lead wire portion in the flatwise direction and the edgewise direction, as in the technology described in Japanese Patent Application Publication No. 2004-297863, in order to achieve a size reduction of the rotary electric machine while suppressing interference between lead wire portions (conductors). By shaping an edgewise bent portion, in which a lead wire portion is bent in the edgewise direction, using a pair of shaping dies, however, the lead wire portion may contact the dies because of the spring back caused by the shaping, or the lead wire portion which has been bulged by the shaping may be stretched (in a cavity) inside the dies which enclose the lead wire portion. Therefore, the lead wire portion may be deformed by being dragged by the dies because of the friction between the lead wire portion and the dies when the shaping dies are moved away from each other, which may degrade the shaping precision. Such degradation in shaping precision may be caused not only to conductors with a rectangular (oblong) cross section, but also to conductors with a square, circular, or elliptical cross section in the case where such conductors are subjected to bending in a first bend direction and bending in a second bend direction, which is orthogonal to the first bend direction, by a pair of shaping dies.

The present disclosure according to an exemplary aspect secures good precision in shaping a conductor when shaping a first bent portion and a second bent portion in which a conductor is bent in a first bend direction and a second bend direction that is orthogonal to the first bend direction, respectively.

The present disclosure provides a conductor shaping apparatus that shapes at least one first bent portion and at least one second bent portion in which a conductor is bent in a first bend direction and a second bend direction that is orthogonal to the first bend direction, respectively, the conductor shaping apparatus including first and second shaping dies that are movable toward and away from each other along a first direction, and that are moved toward each other to shape the at least one first bent portion and the at least one second bent portion, wherein one of the first and second shaping dies is configured to be moved away from the other along a second direction that is different from the first direction not to drag the conductor when the first and second shaping dies are moved away from each other along the first direction after shaping of the first and second bent portions is completed.

The conductor shaping apparatus includes the first and second shaping dies which are movable toward and away from each other along the first direction, and the first and second shaping dies are moved to approach each other to shape the at least one first bent portion and the at least one second bent portion in the conductor. In the conductor shaping apparatus, one of the first and second shaping dies is configured to be moved away from the other in the second direction which is different from the first direction after shaping of the first and second bent portions is completed. Thus, even if the conductor contacts the dies because of the spring back caused by the shaping of the first and second bent portions, or the conductor which has been bulged by the shaping is stretched (in a cavity) inside the dies which encloses the conductor, one of the first and second shaping dies and the conductor can be brought out of contact with (separated from) each other by moving one of the first and second shaping dies away from the other along the second direction after shaping of the first and second bent portions is completed. As a result, it is possible to suppress the conductor being dragged (pulled) along the first direction by one of the first and second shaping dies when the first and second shaping dies are moved away from each other along the first direction. Thus, according to the conductor shaping apparatus, it is possible to secure a good precision in shaping the conductor when shaping the first and second bent portions in the conductor.

The first direction may be parallel to a direction of a load for shaping one of the first and second bent portions, and the second direction may be parallel to a direction of a load for shaping the other of the first and second bent portions and orthogonal to the first direction.

That is, the bulge of one of the first and second bent portions in the first direction, which is the direction of approach of the first and second shaping dies, is larger than the bulge of the other of the first and second bent portions in the second direction, and the area of contact (friction) between one of the first and second bent portions and the first shaping die and the second shaping die tends to be larger than the area of contact (friction) between the other of the first and second bent portions and the first shaping die and the second shaping die. Thus, one of the first and second shaping dies and the conductor can be brought out of contact with (separated from) each other by moving one of the first and second shaping dies away from the other along the second direction after shaping of the first and second bent portions is completed.

One of the first and second shaping dies may be configured to be moved away from the other of the first and second shaping dies along the second direction at the same time as the one of the first and second shaping dies is moved away from the other of the first and second shaping dies along the first direction after shaping of the first and second bent portions is completed. Thus, the movable die and the conductor can be immediately brought out of contact with (separated from) each other while allowing as little movement of the conductor in the first direction as possible.

One of the first and second shaping dies may be configured to be moved away from the other of the first and second shaping dies along the second direction before the one of the first and second shaping dies is moved away from the other of the first and second shaping dies along the first direction after shaping of the first and second bent portions is completed. Thus, the movable die and the conductor can be immediately brought out of contact with (separated from) each other while preventing the conductor from moving in the first direction.

One of the first and second shaping dies may be a movable die that is advanceable and retractable along the first direction, and the other of the first and second shaping dies may be a fixed die. Thus, the movable die and the conductor can be brought out of contact with (separated from) each other by moving the movable die away from the fixed die along the second direction after shaping of the first and second bent portions is completed. Thus, it is possible to suppress the conductor being dragged (pulled) along the first direction by the movable die when the movable die is moved away from the fixed die along the first direction.

The conductor shaping apparatus may further include: a movable stage that is advanceable and retractable along the first direction, and that supports the movable die such that the movable die is turnable about a support shaft that extends in a direction that is orthogonal to both the first and second directions; and an urger disposed between the movable die and the movable stage to urge the movable die away from the fixed die along the second direction, and the movable die may abut against the conductor on a side proximate to the fixed die, in the second direction, with respect to a plane that includes an axis of the support shaft and that extends in the first direction as the movable die approaches the fixed die along the first direction.

In the thus configured conductor shaping apparatus, when the movable stage is further moved toward the fixed die to apply a load for shaping the first and second bent portions to the conductor after the movable die abuts against the conductor as the movable stage approaches the fixed die, the movable die is turned about the support shaft by a force from the fixed die and the conductor against the urging force of the urger so as to approach the fixed die along the second direction to directly face the fixed die. When the movable stage is slightly moved away from the fixed die along the first direction, or a load for shaping the first and second bent portions is removed, after shaping of the first and second bent portions is completed, the movable die is turned about the support shaft by the urging force of the urger to be moved away from the fixed die along the second direction. Thus, the movable die can be moved away from the fixed die along the first direction, without the conductor being dragged (pulled) along the first direction by the movable die, by immediately bringing the movable die and the conductor out of contact with (separating the movable die and the conductor from) each other while allowing as little movement of the conductor in the first direction as possible.

A stroke of movement of the movable die with respect to the fixed die along the second direction may be smaller than a thickness of the conductor in the second direction. Thus, by further moving the movable stage toward the fixed die to apply a load for shaping the first and second bent portions to the conductor after the movable die abuts against the conductor as the movable stage approaches the fixed die, the movable die can be immediately caused to directly face the fixed die by a force from the fixed die and the conductor.

The conductor shaping apparatus may further include a guide that guides the movable die such that the movable die directly faces the fixed die. Thus, the conductor can be shaped more precisely.

The conductor shaping apparatus may further include: a movable stage that is advanceable and retractable along the first direction, and that supports the movable die such that the movable dies is movable in the second direction; an urger disposed between the movable die and the movable stage to urge the movable die away from the fixed die along the second direction; and a guide that is advanceable and retractable along the first direction, and that guides the movable die such that the movable die approaches the fixed die along the second direction against an urging force of the urger as the movable stage approaches the fixed die along the first direction.

In the thus configured conductor shaping apparatus, when the movable stage is moved to approach the fixed die along the first direction, the movable die is guided by the guide so as to approach the fixed die along the second direction against the urging force of the urger to directly face the fixed die. When the guide is moved away from the movable die along the first direction after shaping of the first and second bent portions is completed, the movable die is moved away from the fixed die along the second direction by the urging force of the urger. Thus, the movable die can be moved away from the fixed die along the first direction, without the conductor being dragged (pulled) along the first direction by the movable die, by immediately bringing the movable die and the conductor out of contact with (separating the movable die and the conductor from) each other while preventing the conductor from moving in the first direction before the movable die is moved away from the fixed die along the first direction.

The guide may include a roller that is rotatable about an axis that extends in a direction that is orthogonal to both the first and second directions; and the movable die may abut against the roller on a side proximate to the fixed die, in the second direction, with respect to a plane that includes an axis of the roller and that extends in the first direction as the movable die approaches the fixed die along the first direction. Thus, the movable die can be smoothly guided by the guide so as to approach the fixed die along the second direction against the urging force of the urger.

The conductor shaping apparatus may further include a third shaping die that is movable toward and away from one of the first and second shaping dies along the first direction, and that is capable of cooperating with one of the first and second shaping dies to shape the first bent portion that is the closest to a free end side of the conductor, and the third shaping die may be configured to be movable toward and away from one of the first and second shaping dies along the second direction.

According to such a conductor shaping apparatus, it is possible to shape at least some of the first bent portions provided on the base end side with respect to one of the first bent portions that is the closest to the free end side without restraining the free end portion of the conductor by means of the first and second shaping dies, and to thereafter shape the first bent portion that is the closest to the free end side by means of one of the first and second shaping dies and the third shaping die. As a result, it is possible to suppress an increase in dimensional error and electric resistance by optimizing the amount of expansion of the first bent portions on the base end side of the conductor, and to improve the precision in position of the free end portion of the conductor with respect to the coil. In addition, the third shaping die and the conductor can be brought out of contact with (separated from) each other by moving the third shaping die away from one of the first and second shaping dies along the second direction, which makes it possible to suppress the conductor being dragged (pulled) along the first direction by the third shaping die when the third shaping die is moved away from one of the first and second shaping dies along the first direction. Thus, according to the conductor shaping apparatus, it is possible to secure a better precision in shaping the conductor when shaping the first and second bent portions in the conductor.

The conductor may have a rectangular cross section, the first bend direction may be an edgewise direction that is orthogonal to a short side of the cross section of the conductor, the second bend direction may be a flatwise direction that is orthogonal to a long side of the cross section of the conductor, the first bent portion may be an edgewise bent portion that is bent in the edgewise direction, and the second bent portion may be a flatwise bent portion that is bent in the flatwise direction. It should be noted, however, that the conductor to which the present disclosure is applied is not limited to those with a rectangular (oblong) cross section, and may have a square, circular, or elliptical cross section. In such a case, the first bend direction is a direction that is orthogonal to one side of the (square) cross section, one diameter, or the minor axis of the conductor, and the second bend direction is a direction that is orthogonal to another side that is orthogonal to the one side of the (square) cross section, another diameter that is orthogonal to the one diameter, or the major axis of the conductor.

The conductor may be a lead wire portion that extends from one end of a coil. That is, the conductor shaping apparatus according to the present disclosure is extremely suitable to precisely shape the lead wire portion extending from one end of the coil which constitutes an electric motor.

The present disclosure also provides a conductor shaping method for shaping at least one first bent portion and at least one second bent portion, in which a conductor is bent in a first bend direction and a second bend direction that is orthogonal to the first bend direction, respectively, using first and second shaping dies that are movable toward and away from each other along a first direction, the conductor shaping method including the steps of: moving the first and second shaping dies to approach each other to shape the at least one first bent portion and the at least one second bent portion; and moving one of the first and second shaping dies away from the other along a second direction that is different from the first direction not to drag the conductor when the first and second shaping dies are moved away from each other along the first direction after shaping of the first and second bent portions is completed.

According to the conductor shaping method, it is possible to secure a good precision in shaping the conductor when shaping the first and second bent portions in the conductor.

DETAILED DESCRIPTION OF EMBODIMENTS

Now, an embodiment of the present disclosure will be described with reference to the drawings.

Figure 1:
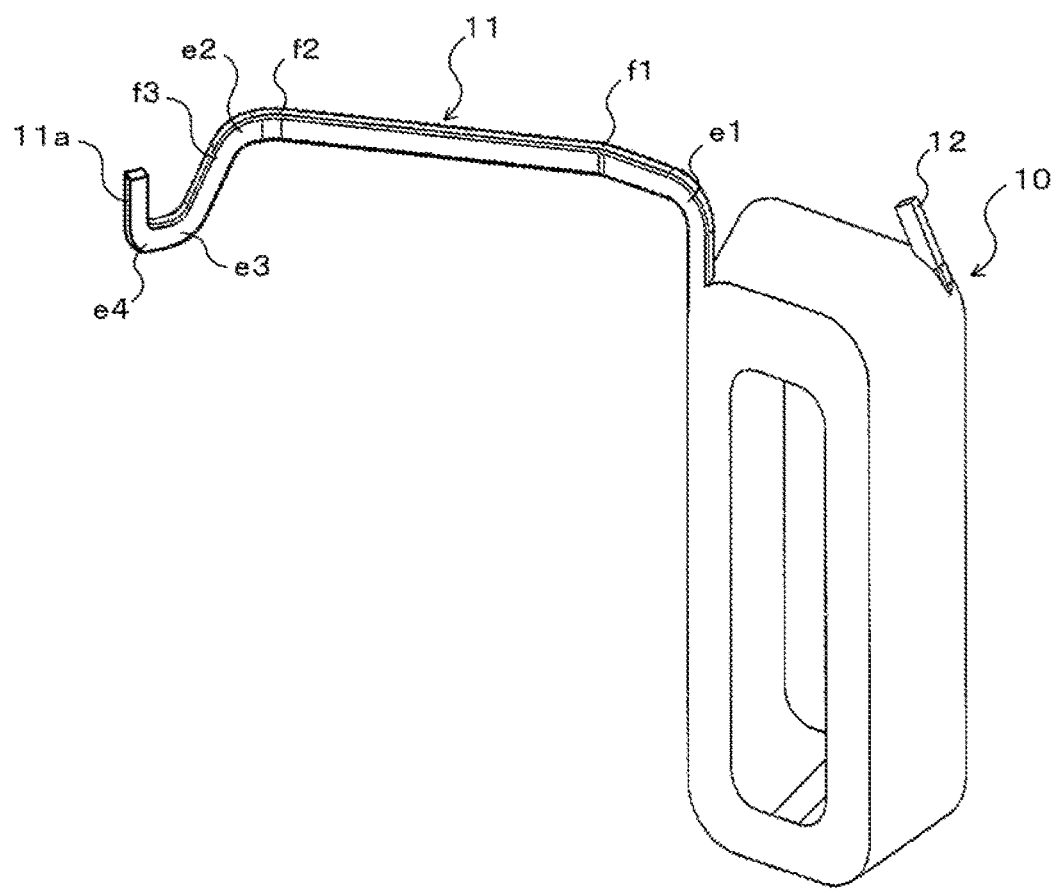
FIG. 1 is a perspective view illustrating a coil shaped by a coil end shaping apparatus as a conductor shaping apparatus according to the present disclosure.

FIG. 1 is a perspective view illustrating a coil 10 shaped by a coil end shaping apparatus as a conductor shaping apparatus according to the present disclosure. The coil 10 illustrated in the drawing is included in an electric motor stator (not illustrated) that constitutes a 3-phase AC electric motor used as a drive source and/or an electric generator for an electric vehicle or a hybrid vehicle, for example, together with a rotor (not illustrated). The electric motor stator includes a plurality of coils 10 and a stator core (not illustrated). The stator core has a plurality of divided cores disposed in an annular arrangement, and a fixation ring to which the plurality of divided cores are fixed. Each of the coils 10 is mounted to a corresponding one of the divided cores via an insulating member (not illustrated). The electric motor stator (stator core) is coated with a molded resin such as a thermosetting resin or a thermoplastic resin on both sides in the axial direction.

As illustrated in FIG. 1, each of the coils 10 is formed by winding a rectangular material with a rectangular cross section a plurality of times. A long-length lead wire portion (conductor) 11 extends from one end of the coil 10. A short-length connection end portion 12 extends from the other end of the coil 10. The lead wire portion 11 of each of the coils 10 has a plurality of edgewise bent portions (first bent portions) e1, e2, e3, and e4 that are bent in the edgewise direction (first bend direction: a direction that is generally orthogonal to the short side of the cross section), and a plurality of flatwise bent portions (second bent portions) f1, f2, and f3 that are bent in the flatwise direction (second bend direction: a direction that is generally orthogonal to the long side of the cross section).

A free end portion 11a of the lead wire portion 11 of one of the coils 10 is electrically connected by welding to the connection end portion 12 of the other corresponding coil 10. That is, the plurality of coils 10 are roughly divided into U-phase coils, V-phase coils, and W-phase coils, and each of the coils 10 is electrically connected to a corresponding one of the coils 10 provided with the other two coils interposed therebetween. In the electric motor stator, only two coils (not illustrated) have a lead wire portion shaped differently from that of the other coils 10. End portions of the lead wire portions of the two coils and the free end portion 11a of the lead wire portion 11 of the coil 10 provided adjacent to the two coils are electrically connected to each other to constitute a neutral point.

In the embodiment, the plurality of edgewise bent portions e1 to e4 and the plurality of flatwise bent portions f1 to f3 are formed such that the lead wire portion 11 extends upward in the axial direction of the stator core from the outer peripheral side of the coil 10 to be bent at a right angle with respect to the axial direction, passes over other coils 10 (coil ends) at a side toward the center of the stator core, and extends downward once and then reverses such that the free end portion 11a extends upward. In addition, the edgewise bent portion e4 that is the closest to the free end side of the lead wire portion 11 is bent in the direction opposite to at least one (in the example of FIG. 2, the edgewise bent portion e2) of two edgewise bent portions e3 and e2 that are the closest to and on the base end side with respect to the edgewise bent portion e4 that is the closest to the free end side.

Figure 2:
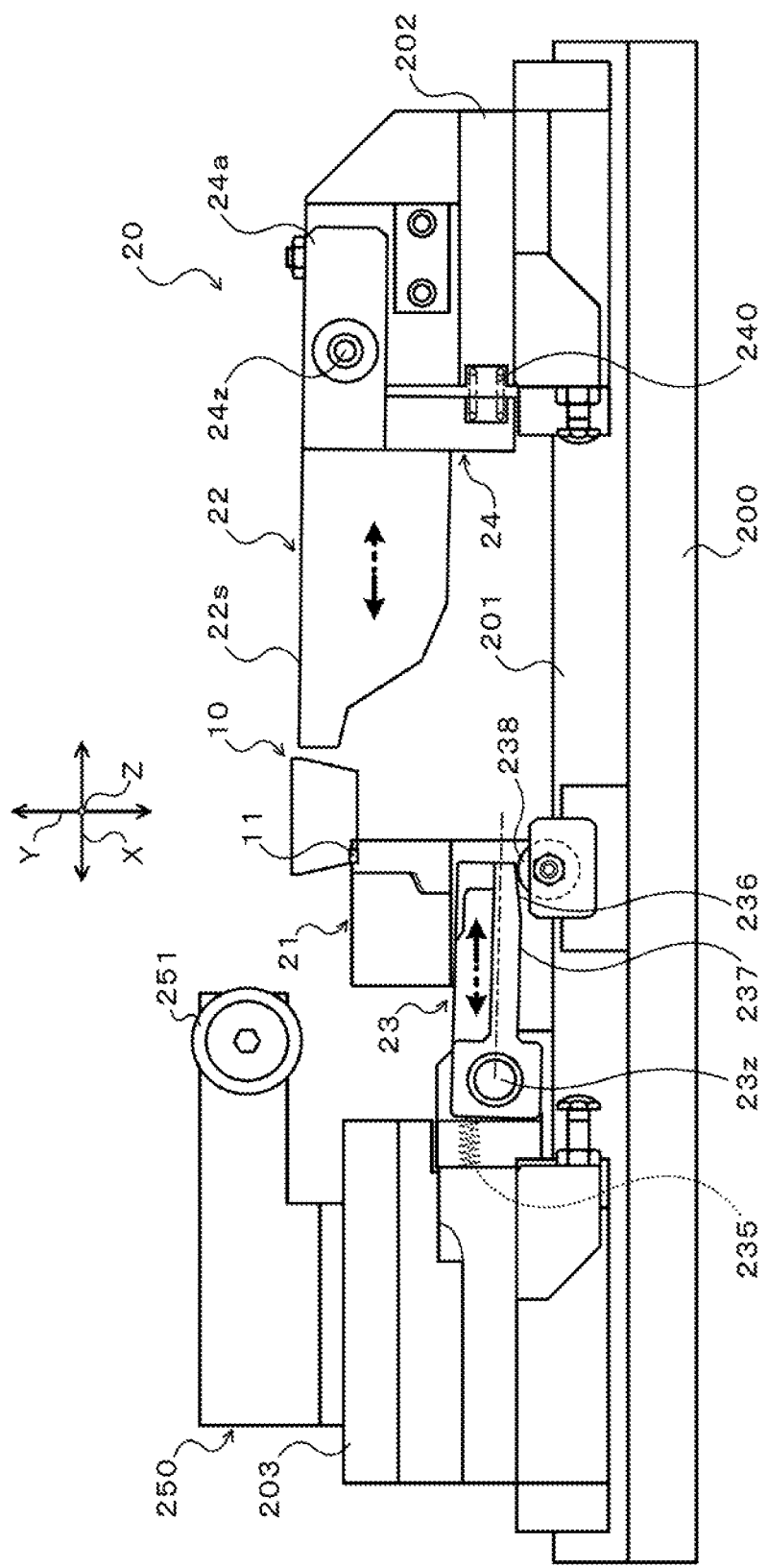
FIG. 2 is a side view of the coil end shaping apparatus.
Figure 3:
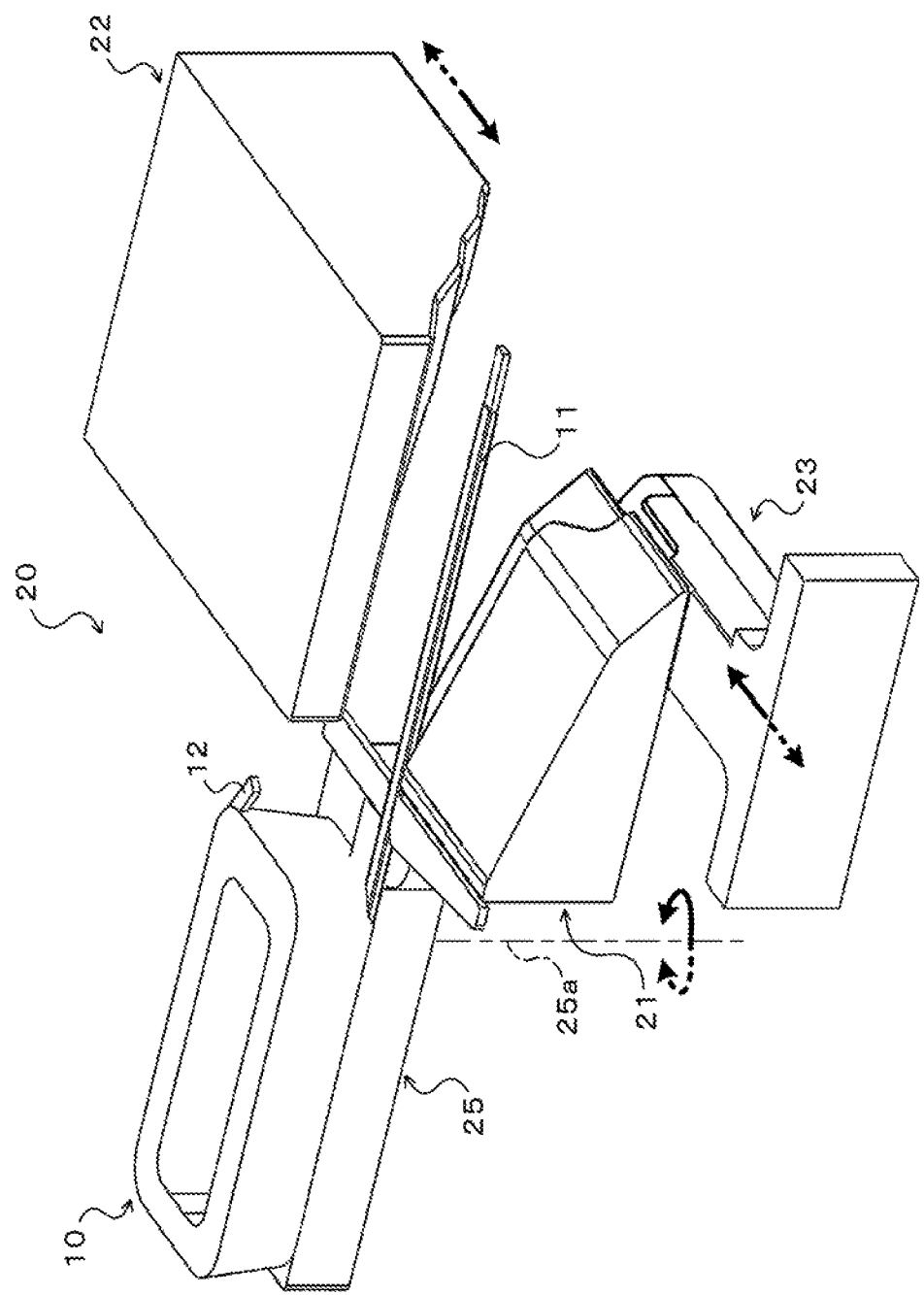
FIG. 3 is a perspective view illustrating the coil end shaping apparatus.
Figure 4:
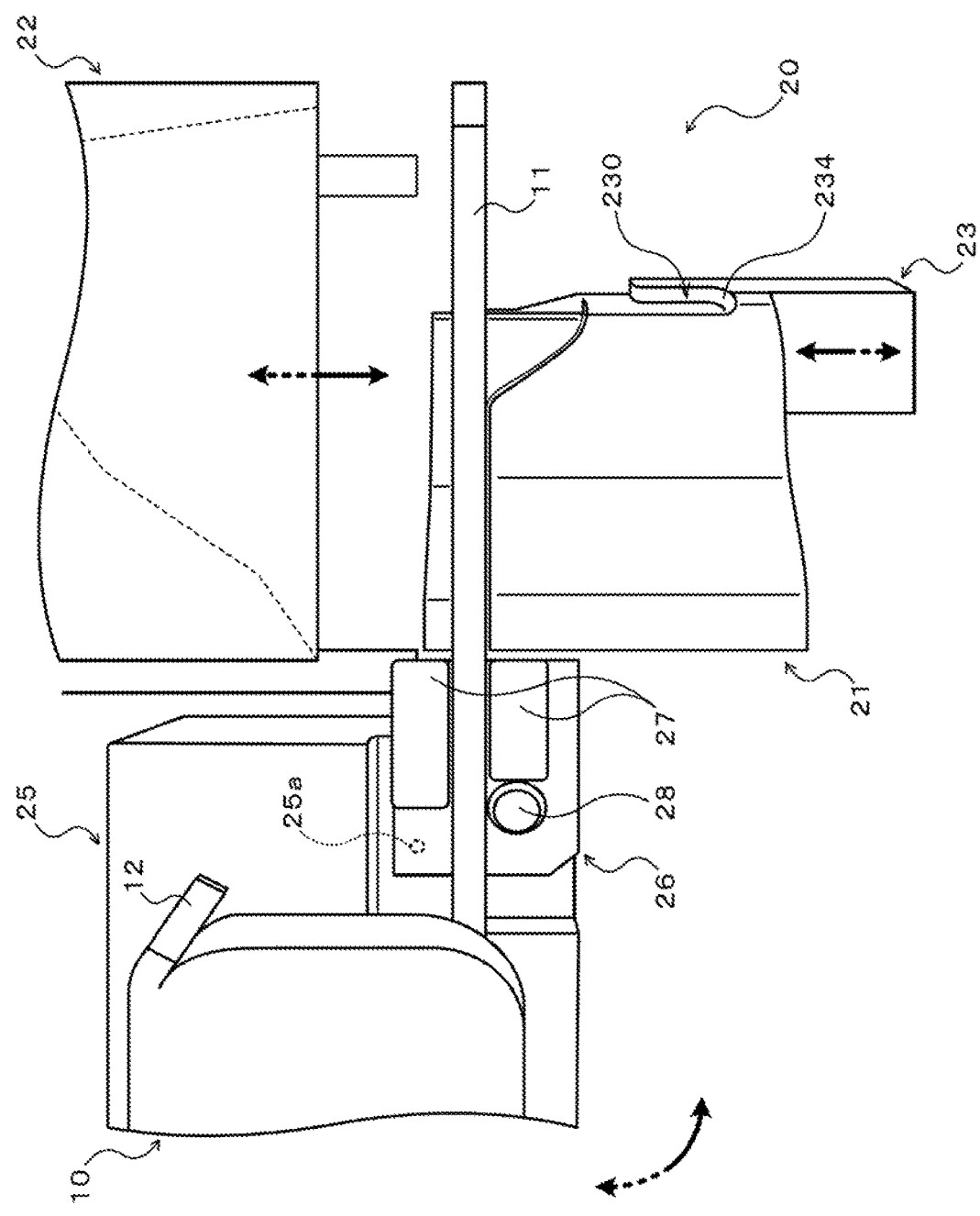
FIG. 4 is a perspective view illustrating the coil end shaping apparatus.

FIG. 2 is a side view illustrating a coil end shaping apparatus 20 used to shape the lead wire portion 11 of the coil 10. FIGS. 3 and 4 are each a perspective view illustrating the coil end shaping apparatus 20. As illustrated in the drawings, the coil end shaping apparatus 20 includes a first shaping die 21, a second shaping die 22, and a third shaping die 23 configured to shape the plurality of edgewise bent portions e2 to e4 and the plurality of flatwise bent portions f1 to 13 in the lead wire portion 11 of the coil 10, and a coil support portion 25 that supports the coil 10. Further, as illustrated in FIG. 4, the coil end shaping apparatus 20 includes a bend guide portion 26 configured to shape the edgewise bent portion e1 that is the closest to the base end side in the lead wire portion 11.

Figure 5:
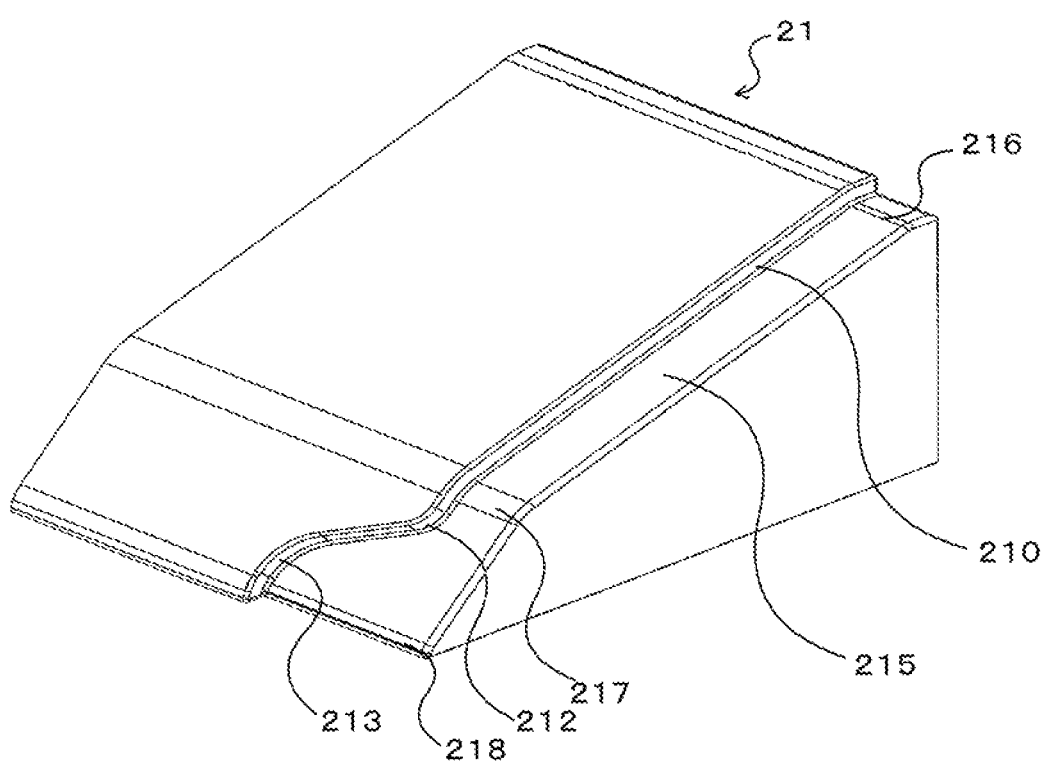
FIG. 5 is a perspective view illustrating a first shaping die.

The first shaping die 21 is a fixed die that is fixed to a base portion 200 (see FIG. 2) placed at the location of installation of the coil end shaping apparatus 20. As illustrated in FIG. 5, the first shaping die 21 has a first edgewise shaping surface 210 configured to shape the edgewise bent portions e2 and e3 in the lead wire portion 11 of the coil 10, and a first flatwise shaping surface 215 configured to shape the flatwise bent portions f1 to f3 in the lead wire portion 11. The first edgewise shaping surface 210 extends along the first flatwise shaping surface 215, and includes a curved surface 212 corresponding to the edgewise bent portion e2 and a curved surface 213 corresponding to the edgewise bent portion e3. In addition, the first flatwise shaping surface 215 includes a curved surface 216 corresponding to the flatwise bent portion f1, a curved surface 217 corresponding to the flatwise bent portion f2, and a curved surface 218 corresponding to the flatwise bent portion f3.

Figure 6:
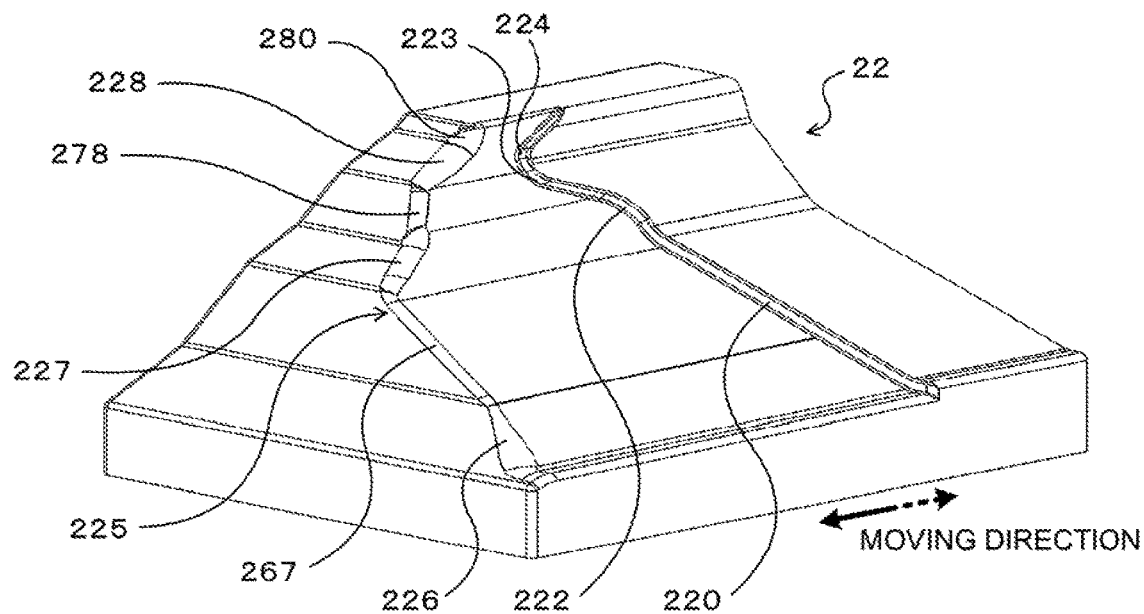
FIG. 6 is a perspective view illustrating a second shaping die.

The second shaping die 22 is a movable die that is supported by a movable stage 202 movably supported by a guide rail 201 fixed to the base portion 200 to extend in the left-right direction in FIG. 2, and that is driven by a drive unit (not illustrated) that includes an electric motor, a hydraulic cylinder, or the like to be advanced and retracted along the extension direction of the guide rail 201, that is, the X direction (first direction) in FIG. 2. The second shaping die 22 can be moved toward the first shaping die 21, which is a fixed die, in the direction indicated by the solid arrow in FIGS. 2 and 3, and moved away from the first shaping die 21 in the direction indicated by the dotted arrow in FIG. 2. As illustrated in FIG. 6, the second shaping die 22 has a second edgewise shaping surface 220 configured to shape the edgewise bent portions e2 and e3 in the lead wire portion 11 of the coil 10, and a second flatwise shaping surface 225 configured to shape the flatwise bent portions f1 to f3 in the lead wire portion 11.

As illustrated in FIG. 6, the second edgewise shaping surface 220 is formed to extend in parallel with the first edgewise shaping surface 210 of the first shaping die 21, and includes a curved surface 222 corresponding to the edgewise bent portion e2, a curved surface 223 corresponding to the edgewise bent portion e3, and a curved surface 224 corresponding to the edgewise bent portion e4. As illustrated in FIG. 6, the second flatwise shaping surface 225 is disposed in proximity to the first shaping die 21 with respect to the second edgewise shaping surface 220. The second flatwise shaping surface 225 includes a pressurizing surface 226 that presses the lead wire portion 11 against the first flatwise shaping surface 215 (curved surface 216) of the first shaping die 21 to shape the flatwise bent portion f1, a pressurizing surface 227 that presses the lead wire portion 11 against the first flatwise shaping surface 215 (curved surface 217) to shape the flatwise bent portion f2, a pressurizing surface 228 that presses the lead wire portion 11 against the first flatwise shaping surface 215 (curved surface 218) to shape the flatwise bent portion f3, a pushing surface 267 between the pressurizing surface 226 and the pressurizing surface 227, a pushing surface 278 between the pressurizing surface 227 and the pressurizing surface 228, and a pushing surface 280 that is continuous with the pressurizing surface 228. The pushing surfaces 267, 278, and 280 are intended to come into slide contact with the surface of the lead wire portion 11 to suppress a lift of the lead wire portion 11, and do not directly contribute to shaping of the flatwise bent portions f1 to f3.

Figure 7:
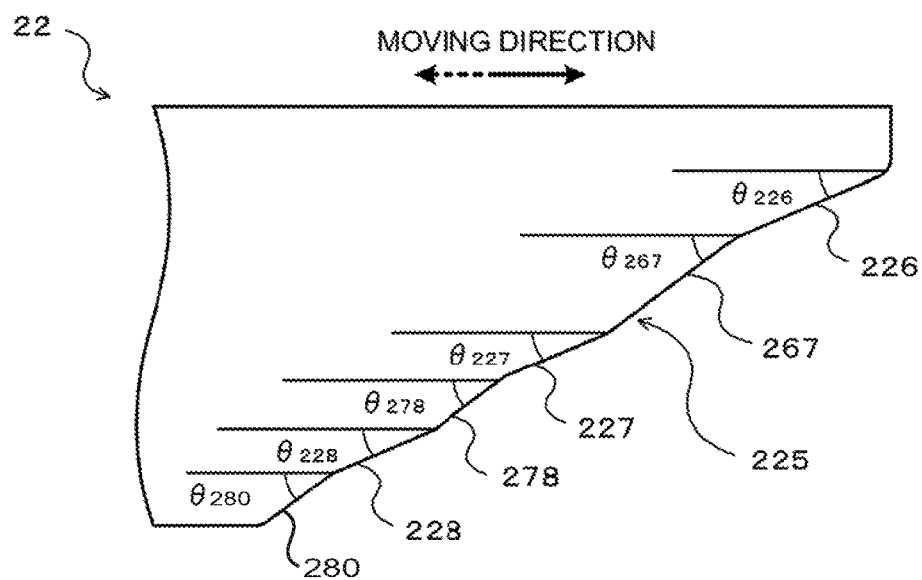
FIG. 7 is a schematic view illustrating the second shaping die.

In the embodiment, the second flatwise shaping surface 225 is formed such that the pressurizing surfaces 226, 227, and 228 sequentially press the lead wire portion 11 of the coil 10 when the second shaping die 22 is moved in the direction indicated by the solid arrow in FIG. 7 to approach the first shaping die 21. That is, the second flatwise shaping surface 225 extends obliquely downward with respect to the moving direction of the second shaping die 22 and in a zigzag manner away from the base end of the lead wire portion 11, starting from the lower surface of a corner portion of the second shaping die 22 that is the most proximate to the base end of the lead wire portion 11. In addition, the pressurizing surfaces 226 to 228 and the pushing surfaces 267, 278, and 280 are formed as curved surfaces that are curved from an edge portion on the first shaping die 21 side (the left edge portion in FIG. 6) to an edge portion on the second edgewise shaping surface 220 side.

As illustrated in FIG. 7, inclination angles $\theta_{267}$, $\theta_{278}$, and $\theta_{280}$ of the pushing surfaces 267, 278, and 280 with respect to the moving direction (a plane (vertical plane) extending in the moving direction) of the second shaping die 22, which is a movable die, are determined to be steeper than inclination angles $\theta_{226}$, $\theta_{227}$, and $\theta_{228}$ of the pressurizing surfaces 226 to 228 with respect to the moving direction (a plane (vertical plane) extending in the moving direction). That is, in the embodiment, the inclination angles $\theta_{267}$, $\theta_{278}$, and $\theta_{280}$ of the pushing surfaces 267, 278, and 280 are set to 45°, for example, and the inclination angles $\theta_{226}$, $\theta_{227}$, and $\theta_{228}$ of the pressurizing surfaces 226 to 228 are set to 30°, for example. Thus, it is possible to reduce the time over which the pushing surfaces 267, 278, and 280, which do not contribute to shaping of the flatwise bent portions f1 to f3, come into slide contact with a portion of the lead wire portion 11 between two flatwise bent portions or the like, that is, the interval of shaping of the plurality of flatwise bent portions f1 to f3, and to achieve a size reduction of the second shaping die 22 in the moving direction. A surface between the edge portion of the pressurizing surfaces 226 to 228 and the pushing surfaces 267, 278, and 280 and the edge portion of the second edgewise shaping surface 220 is preferably slightly inclined such that the second shaping die 22 is smoothly moved away from the first shaping die 21 after shaping of the lead wire portion 11 is completed.

The third shaping die 23 is a movable die that is capable of cooperating with the second shaping die 22 to shape the edgewise bent portion e4 that is the closest to the free end side. As illustrated in FIG. 4, the third shaping die 23 has a third edgewise shaping surface 230 including a curved surface 234 configured to shape the edgewise bent portion e4 that is the closest to the free end side in the lead wire portion 11 of the coil 10. In the embodiment, as illustrated in FIGS. 2 and 3, the third shaping die 23 is disposed below the first shaping die 21, and supported by a movable stage 203 that is movably supported by the guide rail 201 discussed above, and that is driven by a drive unit (not illustrated) that includes an electric motor, a hydraulic cylinder, or the like to be advanced and retracted along the extension direction of the guide rail 201, that is, the X direction (first direction) in FIG. 2. The third shaping die can be moved toward the first and second shaping dies 21 and 22 in the direction indicated by the solid arrow in FIGS. 2 and 3, and moved away from the first and second shaping dies 21 and 22 in the direction indicated by the dotted arrow in FIG. 2.

As illustrated in FIG. 3, the coil support portion 25 has a rotary shaft 25a extending in the flatwise direction (the up-down direction in FIG. 3, that is, the Y direction which is orthogonal to the X direction which is the moving direction of the second shaping die 22) of the lead wire portion 11 of the coil 10 supported by the coil support portion 25 to extend horizontally. The coil support portion 25 can be driven by a drive unit (not illustrated) to be turned about the axis of the rotary shaft 25a. In the embodiment, the rotary shaft 25a of the coil support portion 25 is coupled to the drive unit for the third shaping die 23 via an interlocking mechanism (not illustrated) including a gear train, a link mechanism, or the like, for example. The coil support portion 25 is turned in the direction of the solid arrow in FIG. 3 (counterclockwise) as the third shaping die 23 is moved toward the second shaping die 22 in the direction indicated by the solid line in FIG. 3, and turned in the direction of the dotted arrow in FIG. 3 (clockwise) as the third shaping die 23 is moved away from the second shaping die 22 in the direction indicated by the dotted line in FIG. 3.

As illustrated in FIG. 4, the bend guide portion 26 has a pair of guide members 27 that guide the lead wire portion 11 of the coil 10 supported by the coil support portion 25 from both sides, and a bend fulcrum portion 28 that serves as the bend fulcrum for the edgewise bent portion e1 that is the closest to the base end side of the lead wire portion 11. In the embodiment, the bend fulcrum portion 28 has a columnar shape as illustrated in the drawing, and the axis of the bend fulcrum portion 28 is offset from the axis of the rotary shaft 25a of the coil support portion 25 such that the lead wire portion 11 does not move with respect to the coil support portion 25 and the bend guide portion 26 when the edgewise bent portion e1 is shaped. Thus, it is possible to suppress damage to the lead wire portion 11 due to being rubbed against the bend fulcrum portion 28 when the edgewise bent portion e1 is shaped.

In the embodiment, the bend fulcrum portion 28 has a columnar shape as illustrated in the drawing, and is disposed such that the outer peripheral surface (columnar surface) of the bend fulcrum portion 28 contacts the lead wire portion 11 (side surface). The axis of the rotary shaft 25a of the coil support portion 25 is offset from the bend fulcrum portion 28 such that the lead wire portion 11 does not move with respect to the coil support portion 25 and the bend guide portion 26, that is, the lead wire portion 11 is not expanded with both the free end side of the lead wire portion 11 held (restrained) by the first and second shaping dies 21 and 22 and the base end side of the lead wire portion 11 supported by the coil support portion 25 restrained, when the coil support portion 25 is rotated to shape the edgewise bent portion e1. Thus, it is possible to prevent the lead wire portion 11 from being expanded to become thin when the edgewise bent portion e1 is shaped.

Figure 8:
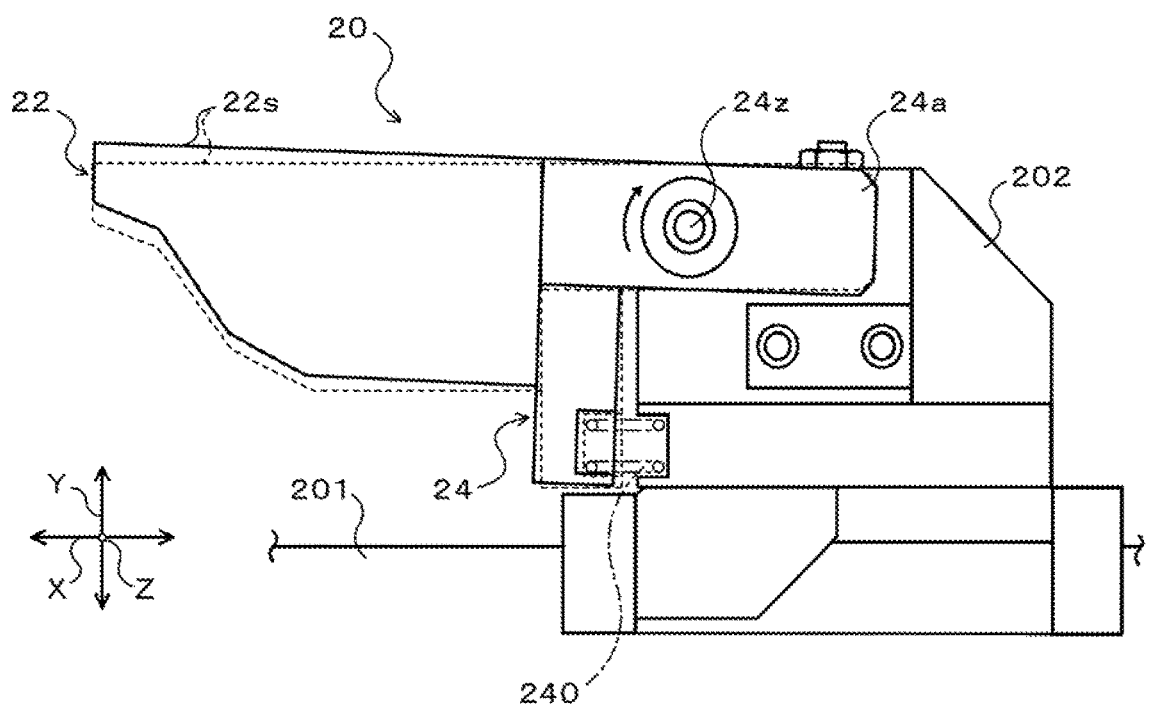
FIG. 8 is a side view illustrating an essential portion of the coil end shaping apparatus.

FIG. 8 is a side view illustrating an essential portion of the coil end shaping apparatus 20. As illustrated in the drawing, a coupling member 24 that has a pair of arm portions 24a that extend rearward (rightward in FIG. 8) is fixed to the back surface (an end surface on the right side in FIG. 8) of the second shaping die 22. The pair of arm portions 24a of the coupling member 24 extend in the Z direction which is orthogonal to both the X direction (the extension direction of the guide rail 201, that is, the first direction) and the Y direction (second direction) which is orthogonal to the X direction, and are turnably supported by a support shaft 24z held by the movable stage 202. Thus, the second shaping die 22 is supported by the movable stage 202 so as to be turnable about the axis of the support shaft 24z.

In addition, a spring (compression spring) 240 that serves as an urger is disposed between the movable stage 202 and the coupling member 24 so as to be positioned on the guide rail 201 side (lower side in FIG. 8) with respect to the axis of the support shaft 24z in the Y direction. Thus, the second shaping die 22 and the coupling member 24 are urged by the spring 240 to be turned clockwise in FIG. 8 about the axis of the support shaft 24z so as to be moved away from the guide rail 201 and the first shaping die 21, which is a fixed die, along the Y direction. In the embodiment, the movable stage 202 is provided with a stopper (not illustrated) that restricts turning of the second shaping die 22 (coupling member 24) in the clockwise direction in FIG. 8. Thus, when the lead wire portion 11 is not being shaped (during standby), the second shaping die 22 is maintained in a state in which the second shaping die 22 has been turned clockwise by a minute angle (e.g. about 0.5 to 1°) (with the free end portion on the first shaping die 21 side slightly ascended) as indicated by the solid line in FIG. 8 from a state in which the second shaping die 22 directly faces the first shaping die 21 as indicated by the broken line in FIG. 8, that is, with the first edgewise shaping surface 210 of the first shaping die 21 and the second edgewise shaping surface 220 of the second shaping die 22 facing each other in parallel with each other.

In the coil end shaping apparatus 20, further, as illustrated in FIG. 2, a guide member 250 that guides the second shaping die 22, which is a movable die, so as to directly face the first shaping die 21, which is a fixed die, is fixed to the movable stage 203 which supports the third shaping die 23. The guide member 250 has a guide roller 251 that is rotatable about an axis that extends in the Z direction which is orthogonal to both the X direction and the Y direction which is orthogonal to the X direction. In the embodiment, an upper surface 22s (the back surface of the surface on which the second edgewise shaping surface 220 and the second flatwise shaping surface 225 are formed) of the second shaping die 22 extends horizontally (in parallel with the X direction) as illustrated in FIG. 8 when the second shaping die 22 directly faces the first shaping die 21. The guide member 250 is fixed to the movable stage 203 such that the guide roller 251 can roll on the upper surface 22s of the second shaping die 22 which directly faces the first shaping die 21.

In the coil end shaping apparatus 20 according to the embodiment, in addition, as illustrated in FIG. 2, a base end portion of the third shaping die 23 extends in the Z direction which is orthogonal to both the X direction and the Y direction which is orthogonal to the X direction, and is movably supported by a support shaft 23z held by the movable stage 203. Thus, the third shaping die 23 is supported by the movable stage 203 so as to be turnable about the axis of the support shaft 23z. A spring (compression spring) 235 that serves as an urger is disposed between the movable stage 203 and the third shaping die 23 so as to be positioned on the first shaping die 21 side (upper side in FIG. 2) with respect to the axis of the support shaft 23z in the Y direction. Thus, the third shaping die 23 is urged by the spring 235 to be turned clockwise in FIG. 2 about the axis of the support shaft 23z so as to be moved away from the first shaping die 21 and the second shaping die 22 along the Y direction.

Further, a first cam surface (inclined surface) 236 and a second cam surface 237 are formed on the lower surface (the back surface of the surface on which the second edgewise shaping surface 220 and the second flatwise shaping surface 225 are formed) of the third shaping die 23. The first cam surface 236 is inclined away from the axis (see the dash-and-dot line in FIG. 2) of the third shaping die 23 as the first cam surface 236 extends from the free end (right end in FIG. 2) toward the base end portion of the third shaping die 23. The second cam surface 237 is provided on the base end side with respect to the first cam surface 236 to extend in parallel with the axis of the third shaping die 23. In addition, the base portion 200 of the coil end shaping apparatus 20 supports a roller 238 such that the roller 238 can roll on the first cam surface 236 and the second cam surface 237 of the third shaping die 23.

In the embodiment, the roller 238 abuts against the first cam surface 236 on the free end side of the third shaping die 23 when the third shaping die 23 and the movable stage 203 are at the stand-by position indicated in FIG. 2. Thus, when the lead wire portion 11 is not being shaped (during stand-by), the third shaping die 23 is maintained in a state in which the third shaping die 23 has been turned clockwise in FIG. 2 by a minute angle (e.g. about 0.5 to 1°) (with the free end portion on the second shaping die 22 side slightly descended) from a state in which the third shaping die 23 directly faces the second shaping die 22, that is, with the axis of the third shaping die 23, which is indicated by the dash-and-dot line in FIG. 2, extending in parallel with the X direction (horizontally). The roller 238 rolls on the first and second cam surfaces 236 and 237 as the third shaping die 23 is moved toward the second shaping die 22 (rightward in FIG. 2). When the roller 238 abuts against the second cam surface 237, the third shaping die 23 is turned counterclockwise in FIG. 2 about the support shaft 23z against the urging force of the spring 235 by a force from the roller 238 to approach the second shaping die 22 along the Y direction to directly face the second shaping die 22.

Next, a coil end shaping method according to the present disclosure, that is, a procedure for shaping the lead wire portion 11 of the coil 10 using the coil end shaping apparatus 20 discussed above, will be described.

Before shaping the lead wire portion 11 using the coil end shaping apparatus 20, the movable stages 202 and 203 are moved to the stand-by position illustrated in FIG. 2 to move the second shaping die 22 away from the first shaping die 21, and to move the third shaping die 23 away from the second shaping die 22. Further, the coil support portion 25 is turned in the direction of the dotted arrow in FIG. 3, and the coil 10 having the lead wire portion 11 extending straight is supported on the coil support portion 25 (see FIGS. 3 and 4), and the lead wire portion 11 is placed between the pair of guide members 27 of the bend guide portion 26. After the coil 10 is set on the coil support portion 25 in this way, the movable stage 202 and the second shaping die 22 are moved by a drive unit (not illustrated) of the movable stage 202 by a distance determined in advance from the stand-by position along the X direction to approach the first shaping die 21 such that the gap between the first edgewise shaping surface 210 and the second edgewise shaping surface 220 coincides with the width of the lead wire portion 11.

As the movable stage 202 approaches the first shaping die 21, the second shaping die 22 (pressurizing surface 226) abuts against the lead wire portion 11 of the coil 10 in the vicinity of the pair of guide members 27 of the bend guide portion 26 to press (a side surface of) the lead wire portion 11 against the first edgewise shaping surface 210 of the first shaping die 21. Here, the coil end shaping apparatus 20 according to the embodiment is configured such that the second shaping die 22 (pressurizing surface 226), which approaches the first shaping die 21 which is a fixed die along the X direction, abuts against the lead wire portion 11 on the side proximate to the first shaping die 21 in the Y direction with respect to a plane PL that includes the axis of the support shaft 24z and that extends in the X direction (first direction) (lower side in FIG. 9 with respect to the plane PL) as indicated by the solid line in FIG. 9.

Figure 9:
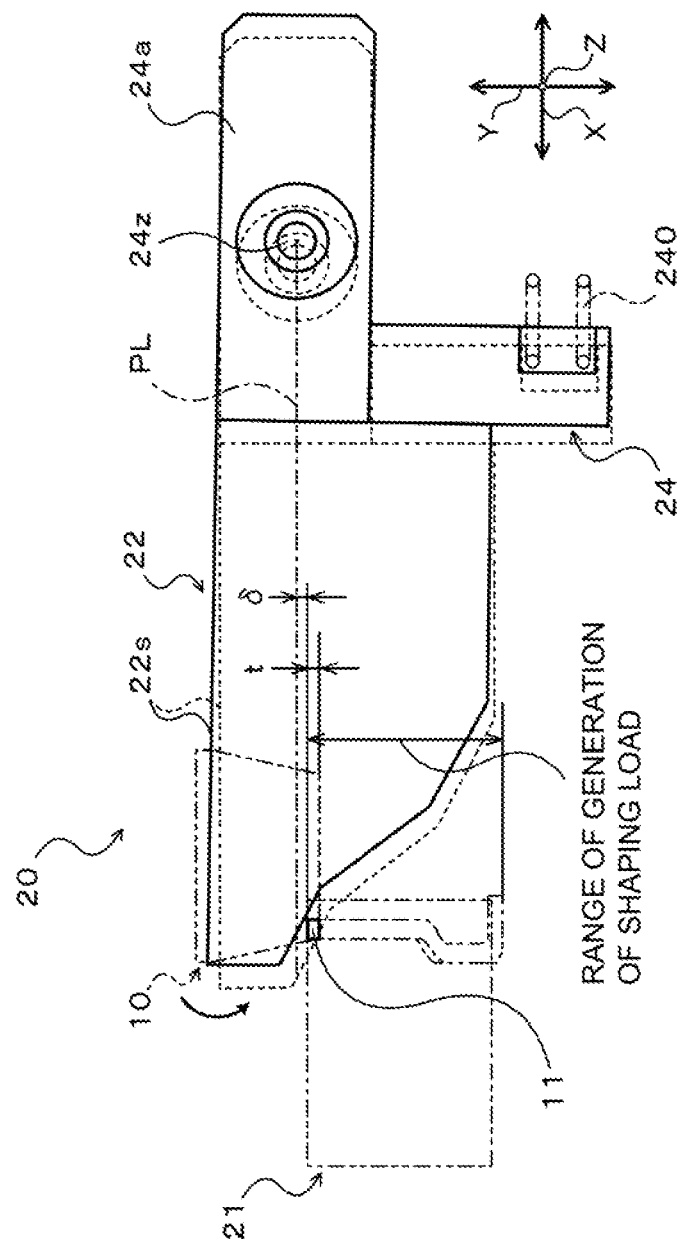
FIG. 9 is an illustration illustrating the procedure for shaping a lead wire portion used by the coil end shaping apparatus.

Thus, when the movable stage 202 is further moved toward the first shaping die 21 after the second shaping die 22 abuts against the lead wire portion 11 as the movable stage 202 approaches the first shaping die 21, the second shaping die 22 is turned counterclockwise in FIG. 9 about the support shaft 24z against the urging force of the spring 240 by a force from the first shaping die 21 and the lead wire portion 11, that is, a force in the direction of moving the second shaping die 22 away from the first shaping die 21 along the Y direction (rightward force in FIG. 9), to approach the first shaping die 21 along the Y direction. When the pressurizing surface 226 of the second shaping die 22 abuts against the upper surface, in FIG. 9, of the lead wire portion 11, the second shaping die 22 directly faces the first shaping die 21 as indicated by the broken line in FIG. 9.

In the embodiment, a stroke of movement 8 of the second shaping die 22 with respect to the first shaping die 21 along the Y direction, or the distance between the lower surface of the free end portion of the pressurizing surface 226 in the ascended state (released state) indicated by the solid line in FIG. 9 and the upper surface, in FIG. 9, of the lead wire portion 11, is determined to be smaller than a thickness t, in the flatwise direction (the Y direction, that is, the second direction), of the lead wire portion 11. Thus, by further moving the movable stage 202 toward the first shaping die 21 after the second shaping die 22 abuts against the lead wire portion 11 as the movable stage 202 approaches the first shaping die 21, the second shaping die 22 can be immediately caused to directly face the first shaping die 21 by a force from the first shaping die 21 and the lead wire portion 11.

By further moving the second shaping die 22 to approach the first shaping die 21 after the second shaping die 22 abuts against the lead wire portion 11 as discussed above, the lead wire portion 11 receives, from the second shaping die 22, a load in a direction that is parallel to the Y direction (downward in FIG. 9) for shaping the flatwise bent portions and a load in a direction that is parallel to the X direction (leftward in FIG. 9) for shaping the edgewise bent portions. Thus, the flatwise bent portions f1, f2, and f3 and the edgewise bent portions e2 and e3 are shaped in the lead wire portion 11 by the first and second shaping dies 21 and 22 during a period since the start of movement of the movable stage 202 and the second shaping die 22 until the movement of the second shaping die 22 etc. is stopped with the gap between the first edgewise shaping surface 210 and the second edgewise shaping surface 220 generally coinciding with the width of the lead wire portion 11.

Figure 10A:
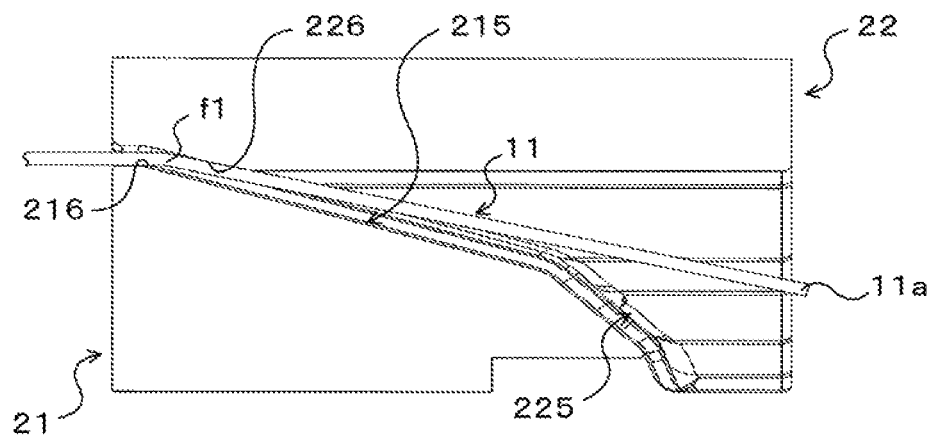
FIGS. 10A, 10B, and 10C are each a schematic view illustrating a procedure for shaping the lead wire portion used by the coil end shaping apparatus.
Figure 10B:
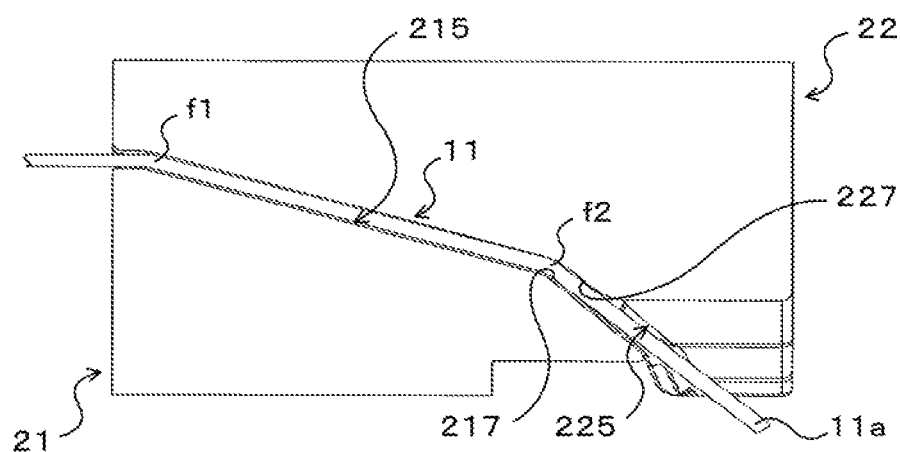
Figure 10C:
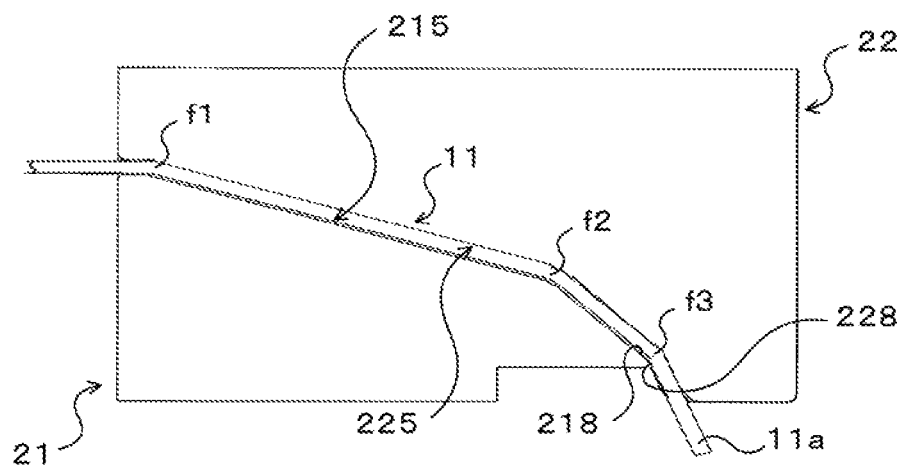

That is, when the first and second shaping dies 21 and 22 approach each other, the flatwise bent portion f1 that is the closest to the base end side of the lead wire portion 11 is first shaped by the curved surface 216 included in the first flatwise shaping surface 215 of the first shaping die 21 and the pressurizing surface 226 included in the second flatwise shaping surface 225 of the second shaping die 22 as illustrated in FIG. 10A. In addition, as the second shaping die 22 is further moved toward the first shaping die 21, the flatwise bent portion f2 of the lead wire portion 11 is shaped by the curved surface 217 included in the first flatwise shaping surface 215 of the first shaping die 21 and the pressurizing surface 227 included in the second flatwise shaping surface 225 of the second shaping die 22 as illustrated in FIG. 10B. Further, during a period since the flatwise bent portion f2 is shaped until movement of the second shaping die 22 is stopped, the flatwise bent portion f3 that is the closest to the free end side of the lead wire portion 11 is shaped by the curved surface 218 included in the first flatwise shaping surface 215 of the first shaping die 21 and the pressurizing surface 228 included in the second flatwise shaping surface 225 of the second shaping die 22 as illustrated in FIG. 10C.

In this way, in the coil end shaping apparatus 20, the plurality of flatwise bent portions f1, f2, and f3 are shaped in the lead wire portion 11 of the coil 10 sequentially from the base end side toward the free end side of the lead wire portion 11 by moving the first and second shaping dies 21 and 22 to approach each other. Thus, it is possible to shape the plurality of flatwise bent portions f1 to f3 in the lead wire portion 11 while suppressing an increase in amount by which the wire material is expanded in particular in the flatwise bent portion f1 on the base end side of the lead wire portion 11.

Figure 11:
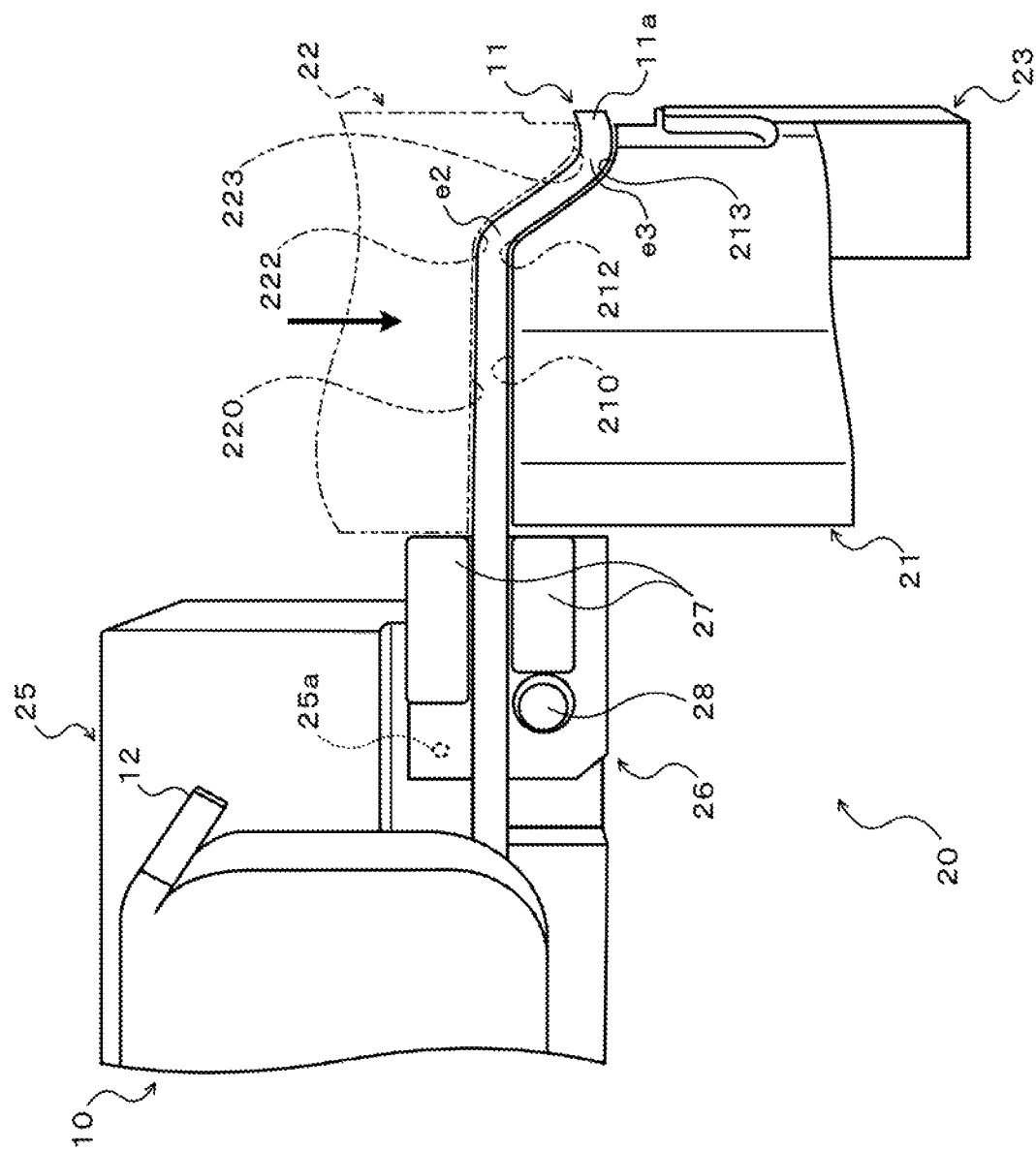
FIG. 11 is a perspective view illustrating the procedure for shaping the lead wire portion used by the coil end shaping apparatus.

In addition, during a period since the start to the end of movement of the movable stage 202 and the second shaping die 22 with respect to the first shaping die 21, as illustrated in FIG. 11, the edgewise bent portion e2 is shaped by the curved surface 212 included in the first edgewise shaping surface 210 of the first shaping die 21 and the curved surface 222 included in the second edgewise shaping surface 220 of the second shaping die 22. Further, as illustrated in FIG. 11, the edgewise bent portion e3 is shaped by the curved surface 213 included in the first edgewise shaping surface 210 and the curved surface 223 included in the second edgewise shaping surface 220. That is, the edgewise bent portions e2 and e3 provided on the base end side with respect to the edgewise bent portion e4 that is the closest to the free end side are shaped in the lead wire portion 11 by moving the first and second shaping dies 21 and 22 to approach each other.

In this way, according to the coil end shaping apparatus 20, it is possible to shape the edgewise bent portions e2 and e3 provided on the base end side with respect to the edgewise bent portion e4 that is the closest to the free end side, that is, positioned between the edgewise bent portion e1 that is the closest to the base end side and the edgewise bent portion e4 that is the closest to the free end side, without restraining the free end portion 11a of the lead wire portion 11. Thus, it is possible to suppress an increase in amount by which the wire material is expanded in the edgewise bent portions e2 and e3, which tends to occur when the edgewise bent portions e2 and e3 are shaped with the free end portion 11a restrained, and to suppress an increase in dimensional error of the lead wire portion 11 and electric resistance at the edgewise bent portions e2 and e3.

Figure 12:
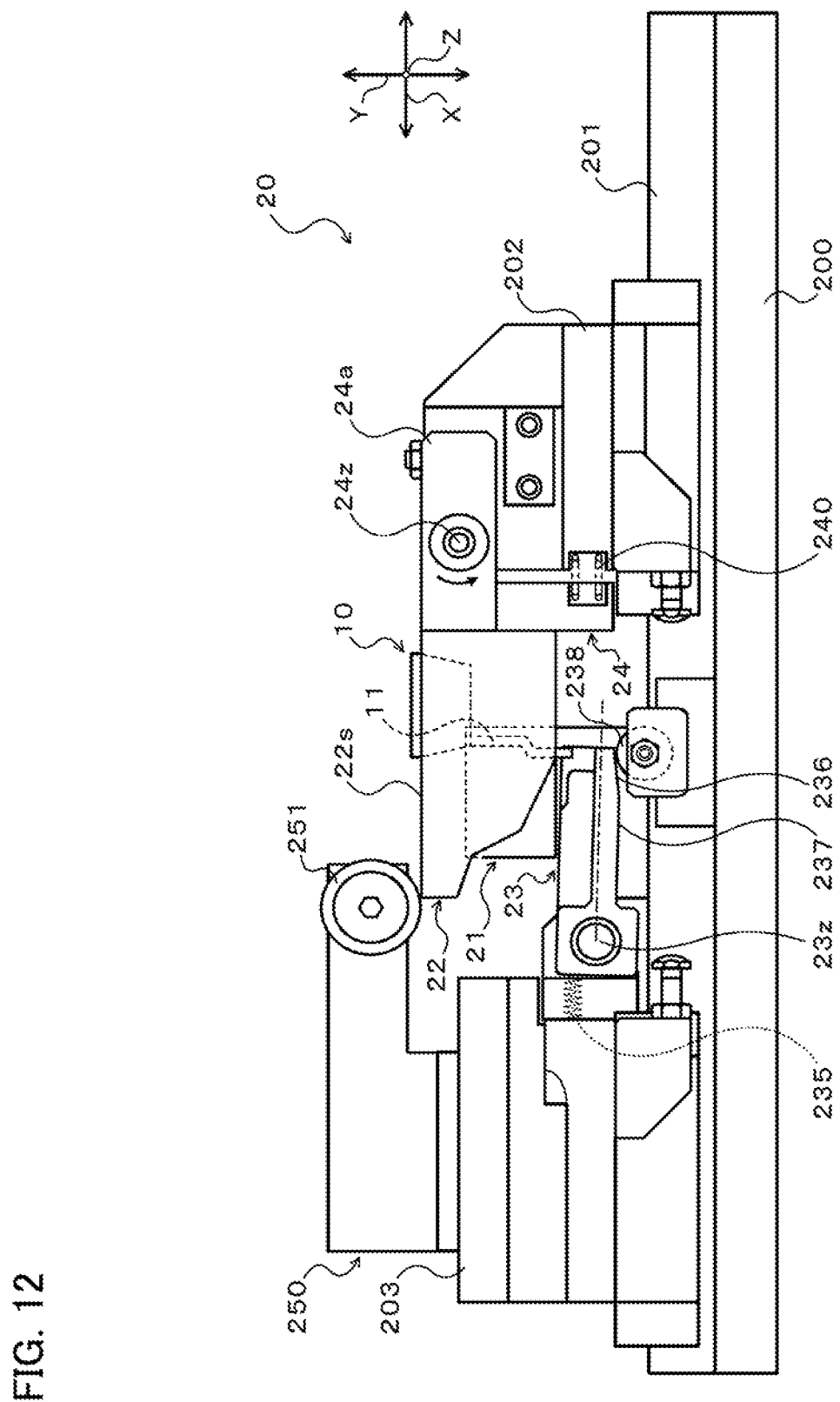
FIG. 12 is a side view illustrating the procedure for shaping the lead wire portion used by the coil end shaping apparatus.

The movable stage 202 and the second shaping die 22 are stopped when the movable stage 202 and the second shaping die 22 have moved along the X direction by a distance determined in advance from the stand-by position, and kept at the stop position. A load (torque) in the X direction from the second shaping die 22 toward the first shaping die 21 (leftward in FIG. 9 etc.) may be applied to the movable stage 202 and the second shaping die 22, which have been stopped, to keep the movable stage 202 and the second shaping die 22 at the stop position, or the movable stage 202 and the second shaping die 22 may be mechanically kept at the stop position by the action of a feed screw or the like. When movement of the movable stage 202 and the second shaping die 22 with respect to the first shaping die 21 is stopped, in addition, the upper surface 22s of the second shaping die 22 which directly faces the first shaping die 21 extends horizontally (in parallel with the X direction), and the distal end (an edge portion at the left end in FIG. 12) of the upper surface 22s contacts, or faces via a minute gap, the guide roller 251 which is supported by the guide member 250 which is fixed to the movable stage 203 at the stand-by position as illustrated in FIG. 12.

Figure 13:
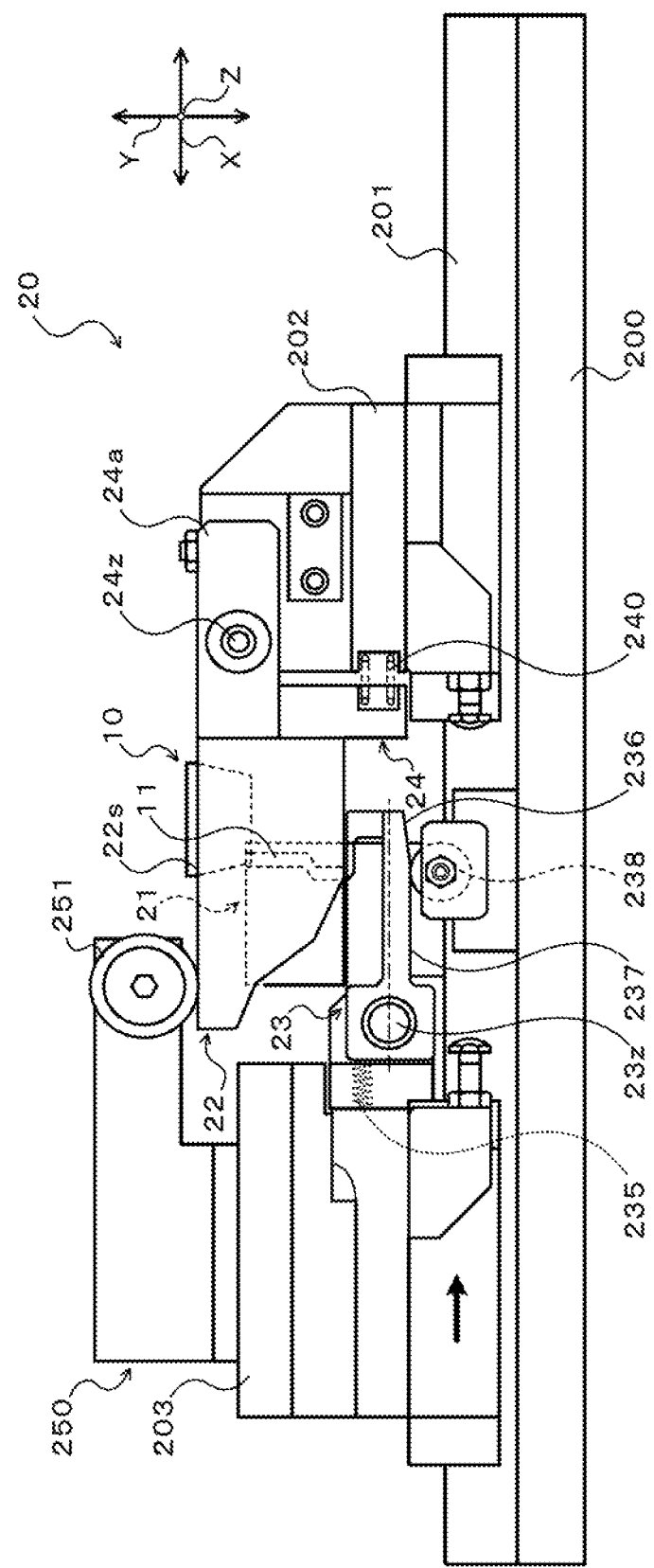
FIG. 13 is a side view illustrating the procedure for shaping the lead wire portion used by the coil end shaping apparatus.

After movement of the movable stage 202 and the second shaping die 22 with respect to the first shaping die 21 is stopped, the movable stage 203 and the third shaping die 23 are moved by a drive unit (not illustrated) of the movable stage 203 by a distance determined in advance from the stand-by position along the X direction to approach the second shaping die 22 such that the gap between the second edgewise shaping surface 220 and the third edgewise shaping surface 230 coincides with the width of the lead wire portion 11 as illustrated in FIG. 13. When the third shaping die 23 moves toward the second shaping die 22 (rightward in FIG. 13), the roller 238 which is rotatably supported by the base portion 200 first rolls on the first cam surface 236, and thereafter abuts against the second cam surface 237. When the roller 238 abuts against the second cam surface 237, the third shaping die 23 directly faces the second shaping die 22. In addition, the guide roller 251 which is rotatably supported by the guide member 250 of the movable stage 203 rolls on the first shaping die 21 and the upper surface 22s of the second shaping die 22 to guide (support) the second shaping die 22 such that the second shaping die 22 directly faces the first shaping die 21.

Thus, the edgewise bent portion e4 that is the closest to the free end side can be shaped precisely by the curved surface 224 included in the second edgewise shaping surface 220 of the second shaping die 22 and the curved surface 234 included in the third edgewise shaping surface 230 of the third shaping die 23 by moving the third shaping die 23 to approach the second shaping die 22. The precision in position of the free end portion 11a of the lead wire portion 11, which serves as a portion for connection with the connection end portion 12 of the other coil 10, with respect to the coil 10, can be improved by shaping the edgewise bent portion e4 that is the closest to the free end side after shaping the edgewise bent portions e2 and e3 provided on the base end side of the lead wire portion 11 without restraining the free end portion 11a of the lead wire portion 11. In the embodiment, the second and third shaping dies 22 and 23 are configured to provide the edgewise bent portion e4 that is the closest to the free end side with a bent shape that is more significant (tighter) than that of the final product shape in consideration of the spring back of the lead wire portion 11.

Figure 14:
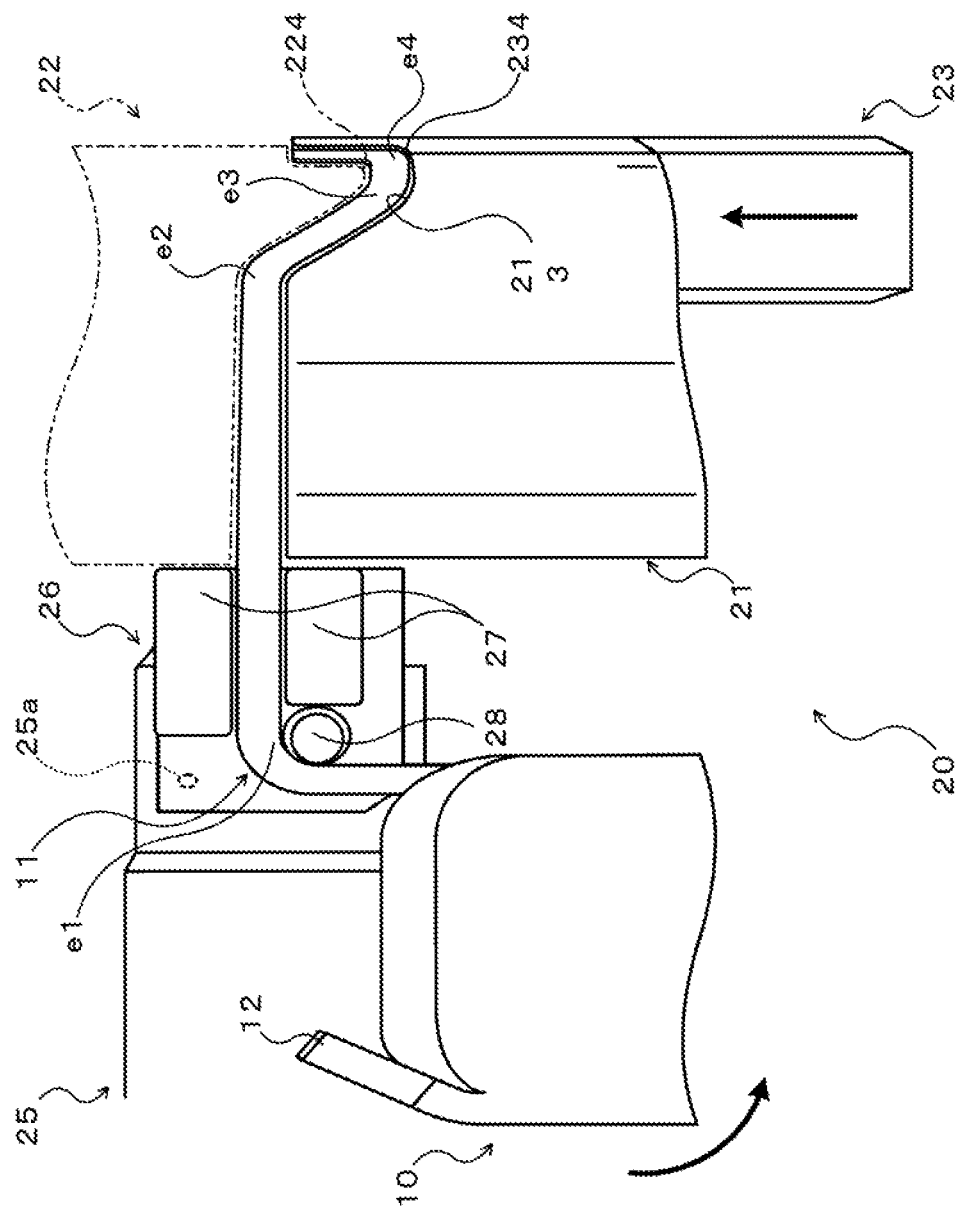
FIG. 14 is a perspective view illustrating the procedure for shaping the lead wire portion used by the coil end shaping apparatus.

In the coil end shaping apparatus 20 according to the embodiment, in addition, the coil support portion 25 which supports the coil 10 is turned counterclockwise in FIG. 14 about the axis of the rotary shaft 25a in conjunction with movement of the third shaping die 23 with respect to the second shaping die 22 as illustrated in FIG. 14. Thus, the edgewise bent portion e1 that is the closest to the base end side can be shaped by bending the lead wire portion 11 in the edgewise direction using the bend fulcrum portion 28 as the fulcrum through turning of the coil support portion 25 which supports the coil 10 with the free end side of the lead wire portion 11 held (restrained) by at least the first and second shaping dies 21 and 22. As a result, it is possible to shape the edgewise bent portion e1 that is the closest to the base end side while securing the precision in position of the free end portion 11a of the lead wire portion 11 with respect to the coil 10. In the embodiment, shaping of the edgewise bent portion e1 that is the closest to the base end side is completed by turning the coil support portion 25 by 90° counterclockwise from the initial position as illustrated in FIG. 11.

After shaping of the plurality of edgewise bent portions e1, e2, e3, and e4 and the plurality of flatwise bent portions f1, f2, and f3 in the lead wire portion 11 is completed as discussed above, the movable stage 203 is moved by a drive unit (not illustrated) to the stand-by position along the X direction to move the third shaping die 23 away from the second shaping die 22. Then, the movable stage 202 is moved by a drive unit (not illustrated) to the stand-by position along the X direction to move the second shaping die 22 away from the first shaping die 21, and the coil 10 is removed from the coil support portion 25.

Figure 15:
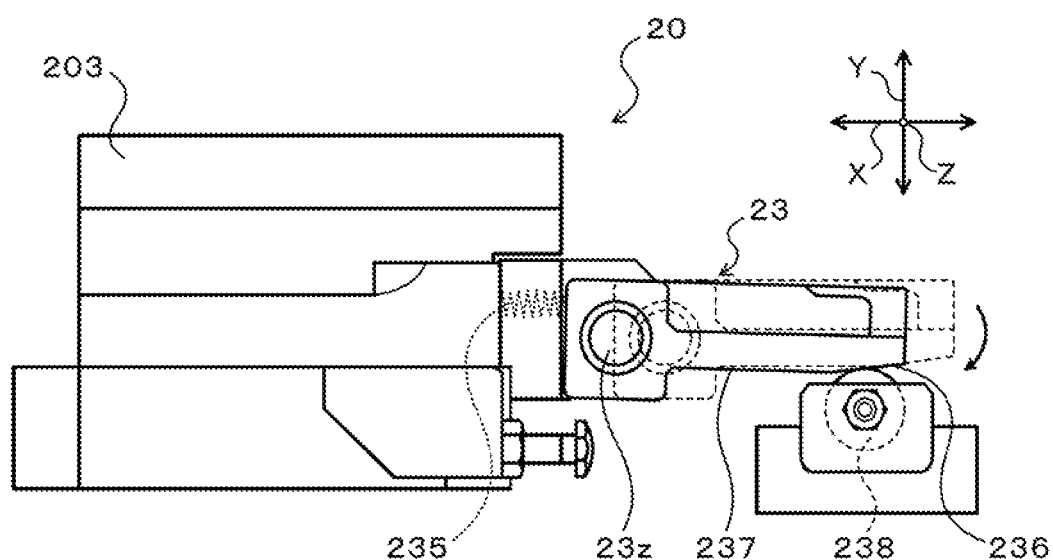
FIG. 15 is a side view illustrating the procedure for shaping the lead wire portion used by the coil end shaping apparatus.

In the coil end shaping apparatus 20, when the third shaping die 23 is moved away from the second shaping die 22, the roller 238 which has been in abutment with the second cam surface 237 starts rolling on the first cam surface 236. Thus, the third shaping die 23, which has so far directly faced the second shaping die 22 as indicated by the broken line in FIG. 15, is turned clockwise in FIG. 15 about the support shaft 23z by the urging force of the spring 235 to be moved away from the second shaping die 22 along the Y direction (see the solid line in FIG. 15). In addition, when the second shaping die 22 is moved away from the first shaping die 21, the second shaping die 22, which has so far directly faced the first shaping die 21 as indicated by the broken line in FIG. 8, is turned clockwise in FIG. 8 about the support shaft 24z by the urging force of the spring 240 to be moved away from the first shaping die 21 along the Y direction (see the solid line in FIG. 8).

Thus, even if the lead wire portion 11 contacts the second shaping die 22 and the third shaping die 23 because of the spring back caused by the shaping of the edgewise bent portions e2, e3, and e4 and the flatwise bent portions f1, f2, and f3, or the lead wire portion 11 which has been bulged by the shaping is stretched in a cavity which encloses the lead wire portion 11, the third shaping die 23 and the lead wire portion 11 can be brought out of contact with (separated from) each other and the second shaping die 22 and the lead wire portion 11 can be brought out of contact with (separated from) each other by moving the third shaping die 23 away from the second shaping die 22 in the Y direction and moving the second shaping die 22 away from the first shaping die 21 in the Y direction as discussed above. As a result, it is possible to suppress the lead wire portion 11 being dragged (pulled) along the X direction by the third shaping die 23 and the second shaping die 22 when the third shaping die 23 is moved away from the second shaping die 22 along the X direction or when the second shaping die 22 is moved away from the first shaping die 21 along the X direction. Thus, according to the coil end shaping apparatus 20, it is possible to secure a better precision in shaping the lead wire portion 11 when shaping the edgewise bent portions e1 to e4 and the flatwise bent portions f1 to f3 in the lead wire portion 11 extending from one end of the coil 10.

In addition, the bulge of the edgewise bent portions e2 to e4 in the X direction (first direction, i.e. the direction of a load for edgewise bend) is larger than the bulge of the flatwise bent portions f1 to f3 in the Y direction (second direction, i.e. the direction of a load for flatwise bend), and the area of contact (friction) between the edgewise bent portions e2 to e4 and the second shaping die 22, which is a movable die, tends to be larger than the area of contact (friction) between the flatwise bent portions f1 to f3 and the second shaping die 22. Thus, the third shaping die 23 and the second shaping die 22 and the lead wire portion 11 can be immediately brought out of contact with (separated from) each other while allowing as little movement of the lead wire portion 11 in the X direction as possible by moving the third shaping die 23 and the second shaping die 22 away from the second shaping die 22 and the first shaping die 21 along the Y direction after shaping of the edgewise bent portions e1 to e4 and the flatwise bent portions f1 to f3 is completed.

As has been described above, the coil end shaping apparatus 20 discussed above includes the first shaping die 21 and the second shaping die 22 which are movable toward and away from each other along the X direction, and the third shaping die 23 which is movable toward and away from the second shaping die 22 along the X direction. The first and second shaping dies 21 and 22 are moved to approach each other to shape the edgewise bent portions e2 and e3 and the flatwise bent portions f1 to f3 in the lead wire portion 11. The second and third shaping dies 22 and 23 are moved to approach each other to shape the edgewise bent portion e4 that is the closest to the free end side in the lead wire portion 11. The second shaping die 22 is configured to be movable toward and away from the first shaping die 21 along the Y direction which is different from the X direction. The third shaping die 23 is configured to be movable toward and away from the second shaping die 22 along the Y direction which is different from the X direction. According to the coil end shaping apparatus 20, it is possible to secure a better precision in shaping the lead wire portion 11 when shaping the edgewise bent portions e1 to e4 and the flatwise bent portions f1 to 13 in the lead wire portion 11 extending from one end of the coil 10.

In the embodiment described above, the second and third shaping dies 22 and 23, which are movable dies, are configured to be moved (start moving) away from the first shaping die 21 and the second shaping die 22, respectively, along the Y direction at the same time as the second and third shaping dies 22 and 23 are moved away from the first shaping die 21 and the second shaping die 22, respectively, along the X direction. However, the present disclosure is not limited thereto. That is, in the coil end shaping apparatus 20, the second and third shaping dies 22 and 23, which are movable dies, may be configured to be moved away from the first shaping die 21 and the second shaping die 22, respectively, along the Y direction before the second and third shaping dies 22 and 23 are moved away from the first shaping die 21 and the second shaping die 22, respectively, along the X direction. In this case, the second shaping die 22 and the third shaping die 23 can be moved away from the first shaping die 21 and the second shaping die 22, respectively, along the Y direction when the guide member 250 and the roller 238 have been retracted from the second and third shaping dies 22 and 23, respectively, by making the guide member 250 (guide roller 251) and the roller 238 advanceable and retractable in the X direction and setting the spring constant of the spring 240 and the spring 235 as appropriate, for example. Thus, the second shaping die 22 and the third shaping die 23 and the lead wire portion 11 can be immediately brought out of contact with (separated from) each other while preventing the lead wire portion 11 from moving in the X direction.

In the embodiment described above, in addition, the guide member 250 guides (supports) the second shaping die 22 such that the second shaping die 22 directly faces the first shaping die 21 when the third shaping die 23 is moved to approach the second shaping die 22 to shape the edgewise bent portion e4 that is the closest to the free end side in the lead wire portion 11. However, the present disclosure is not limited thereto. That is, the guide member 250 (guide roller 251) may be configured to guide (support) the second shaping die 22 such that the second shaping die 22 directly faces the first shaping die 21 when the second shaping die 22 is moved to approach the first shaping die 21 to shape the edgewise bent portions e2 and e3 and the flatwise bent portions f1 to f3 in the lead wire portion 11. In this case, the guide member 250 may be configured not to prevent the second shaping die 22 from moving in the Y direction when the second shaping die 22 is moved away from the first shaping die 21 along the Y direction by configuring the guide member 250 to be movable in the X direction with respect to the movable stage 203 and setting the stroke of the movable stage 203 (third shaping die 23) in the X direction, the length, in the X direction, of the first and second cam surfaces 236 and 237 of the third shaping die 23, and so forth.

Figure 16:
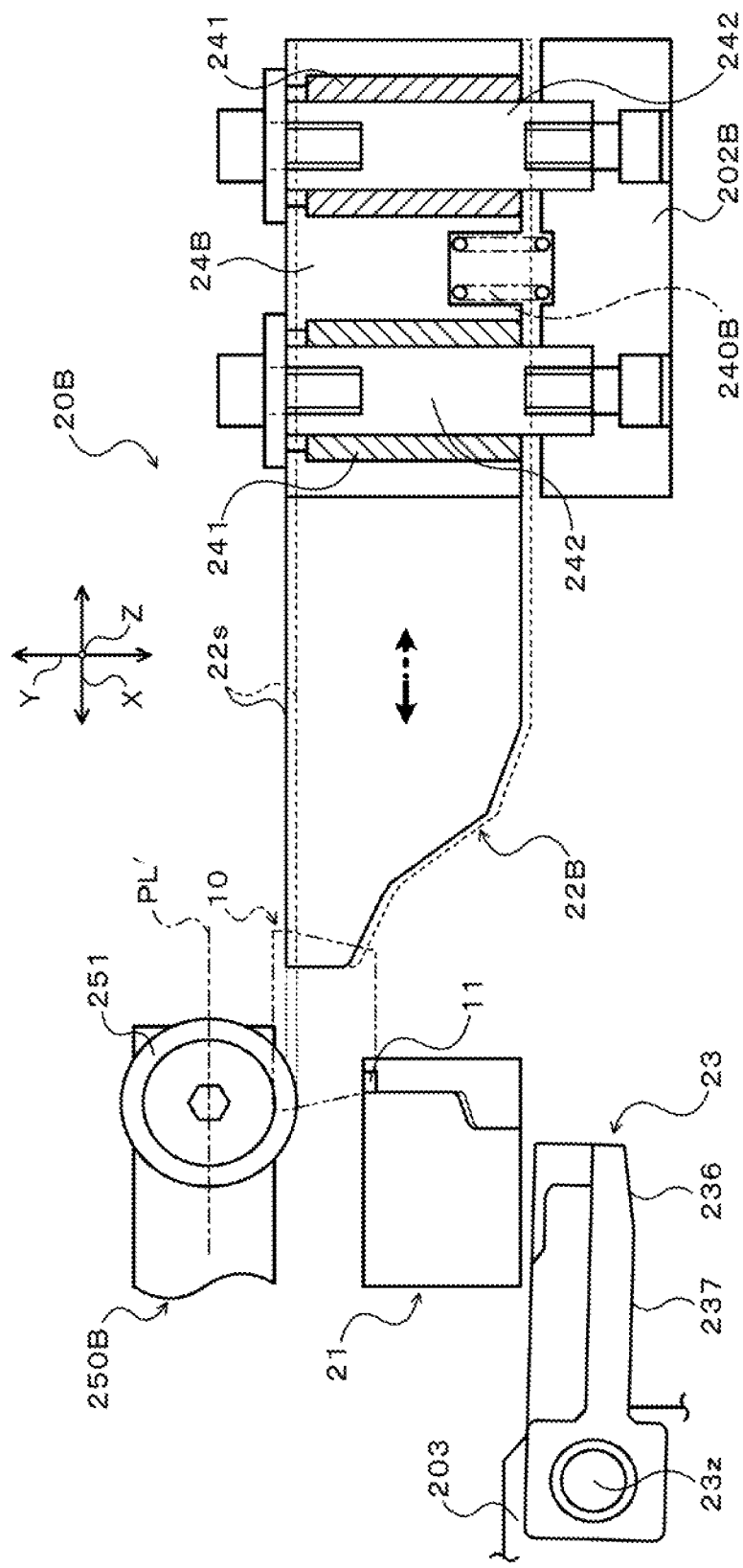
FIG. 16 illustrates a schematic configuration of a coil end shaping apparatus as a conductor shaping apparatus according to another embodiment of the present disclosure.

FIG. 16 illustrates a schematic configuration of a coil end shaping apparatus 20B according to another embodiment of the present disclosure. Elements that are identical to the elements described in relation to the coil end shaping apparatus 20 discussed above are given the same reference numerals to omit redundant descriptions.

In the coil end shaping apparatus 20B illustrated in FIG. 16, a coupling member 24B fixed to a second shaping die 22B, which is a movable die, is supported so as to be movable in the Y direction by a movable stage 202B via a plurality of sleeves (bearings) 241 and a coupling shaft 242.

In addition, a spring 240B (urger) is disposed between the coupling member 24B and the movable stage 202B. The spring 240B urges the coupling member 24B and the second shaping die 22B upward in FIG. 16 such that the coupling member 24B and the second shaping die 22B are moved away from the movable stage 202B and the first shaping die 21, which is a fixed die.

Further, a guide member 250B is fixed to the movable stage 203 which supports the third shaping die 23 and which is advanceable and retractable along the X direction. The guide member 250B has the guide roller 251 which is rotatable about an axis that extends in the Z direction which is orthogonal to both the X direction and the Y direction. The guide member 250B is fixed to the movable stage 203 such that the guide roller 251 abuts against the second shaping die 22, which approaches the first shaping die 21 along the X direction, on the side (lower side in FIG. 16) proximate to the first shaping die 21, in the Y direction, with respect to a plane PL' that includes the axis of the guide roller 251 and that extends in the X direction.

In the thus configured coil end shaping apparatus 20B, when the movable stage 202B is moved along the X direction to approach the first shaping die 21, the second shaping die 22 which approaches the first shaping die 21 is smoothly guided by the guide roller 251 of the guide member 250B so as to approach the movable stage 202B and the first shaping die 21 along the Y direction against the urging force of the spring 240B to directly face the first shaping die 21. Thus, the second shaping die 22 can be guided (supported) so as to directly face the first and third shaping dies 21 and 23 while the edgewise bent portions and the flatwise bent portions are shaped by the first to third shaping dies 21 to 23.

In addition, when the guide member 250B is moved along the X direction away from the second shaping die 22 together with the movable stage 203 after shaping of all the edgewise bent portions and the flatwise bent portions is completed, the second shaping die 22 is moved away from the first shaping die 21 along the Y direction by the urging force of the spring 240B. Thus, the second shaping die 22 can be moved away from the first shaping die 21 along the X direction, without the lead wire portion 11 being dragged (pulled) along the X direction by the second shaping die 22, by immediately bringing the second shaping die 22 and the lead wire portion 11 out of contact with (separating the second shaping die 22 and the lead wire portion 11 from) each other while preventing the lead wire portion 11 from moving in the X direction.

Also in the coil end shaping apparatus 20B, the guide member 250B may be configured not to prevent the second shaping die 22 from moving in the Y direction when the second shaping die 22 is moved away from the first shaping die 21 along the Y direction by configuring the guide member 250B to be movable in the X direction with respect to the movable stage 203 and setting the stroke of the movable stage 203 (third shaping die 23) in the X direction, the length, in the X direction, of the first and second cam surfaces 236 and 237 of the third shaping die 23, and so forth.

In the coil end shaping apparatus 20, 20B described above, the first shaping die 21 may be a movable die, and the second shaping die 22, 22B may be a fixed die. In addition, the third shaping die 23 may cooperate with the first shaping die 21 to shape the edgewise bent portion e4. Further, in the coil end shaping apparatus 20, 20B, the first shaping die 21 may be configured to be movable toward and away from the second shaping die 22 along the Y direction which is different from the X direction, and the second shaping die 22 may be configured to be movable toward and away from the third shaping die 23 along the Y direction which is different from the X direction. In addition, a dedicated drive unit configured to turn the coil support portion 25 may be used in place of causing the coil support portion 25 to operate in conjunction with the third shaping die 23. Further, the coil end shaping apparatus 20, 20B may be configured such that the first and second shaping dies 21 and 22 shape some (at least one) of the edgewise bent portions provided on the base end side with respect to the edgewise bent portion e4 that is the closest to the free end side, and such that the second shaping die 22 and the third shaping die 23 are used to shape the edgewise bent portion e4 that is the closest to the free end side and some (at least one) of the edgewise bent portions provided on the base end side with respect to the edgewise bent portion e4.

Further, the third shaping die 23 may be omitted from the coil end shaping apparatus 20, 20B. That is, a coil end shaping apparatus that shapes a plurality of edgewise bent portions that are bent in the edgewise direction in a lead wire portion extending from one end of a coil may include first and second shaping dies capable of approaching each other to shape at least some of the plurality of edgewise bent portions and at least one flatwise bent portion. Thus, at least one edgewise bent portion and at least one flatwise bent portion can be shaped in the lead wire portion by moving the first and second shaping dies to approach each other. Thus, it is possible to further shorten the time required to shape the edgewise bent portion and the flatwise bent portion in the lead wire portion. Such a coil end shaping apparatus may be configured to be able to shape the plurality of flatwise bent portions in the lead wire portion sequentially from the base end side toward the free end side of the lead wire portion. Thus, it is possible to shape the plurality of flatwise bent portions in the lead wire portion while suppressing an increase in amount by which the wire material is expanded in the flatwise bent portion on the base end side of the lead wire portion.

While the coil end shaping apparatus 20, 20B is extremely suitable to precisely shape the lead wire portion 11 extending from one end of the coil 10 which constitutes an electric motor stator. However, the coil end shaping apparatus 20, 20B may be configured to shape an edgewise bent portion and a flatwise bent portion in a conductor such as a rectangular wire. In addition, the lead wire portion 11 and the conductor which are to be shaped by the coil end shaping apparatus 20, 20B are not limited to those with a rectangular (oblong) cross section, and may have a square, circular, or elliptical cross section. In such a case, the first bend direction corresponding to the edgewise direction is a direction that is orthogonal to one side of the (square) cross section, one diameter, or the minor axis of the conductor, and the second bend direction corresponding to the flatwise direction is a direction that is orthogonal to another side that is orthogonal to the one side of the (square) cross section, another diameter that is orthogonal to the one diameter, or the major axis of the conductor.

While embodiments of the present disclosure have been described above, it is a matter of course that the present disclosure is not limited to the embodiments described above in any way, and that the present disclosure may be modified in various ways without departing from the scope of the present disclosure. In addition, the mode for carrying out the present disclosure described above is merely a specific form of the disclosure described in the "SUMMARY" section, and does not limit the elements of the disclosure described in the "SUMMARY" section.

INDUSTRIAL APPLICABILITY

The present disclosure can be utilized in the industry for the manufacture of coils including a lead wire portion at one end and conductors having a bent portion.

The invention claimed is:

1. A conductor shaping apparatus that shapes at least one first bent portion and at least one second bent portion of a conductor that is bent in a first bend axis and a second bend axis that is orthogonal to the first bend axis, respectively, the conductor shaping apparatus comprising
   first and second shaping dies that are movable toward and away from each other along a first axis, and that are moved toward each other to shape the at least one first bent portion and the at least one second bent portion, wherein
   one of the first and second shaping dies is configured to be moved away from the other along a second axis that is different from the first axis such that the conductor is not dragged when the first and second shaping dies are moved away from each other along the first axis after shaping of the first and second bent portions is completed,
   wherein, the first and second shaping dies are configured such that:
      the first and second shaping dies approach each other along the first axis until the conductor abuts a first bending portion pressing surface of the second shaping die,
      the first and second shaping dies thereafter approach each other along the second axis until the conductor abuts a second bending portion pressing surface of the second shaping die,
      the first and second shaping dies thereafter approach along only the first axis to form the first and second bent portions, and
      the first and second shaping dies are moved away from each along only the second axis after shaping is complete.

2. The conductor shaping apparatus according to claim 1, wherein
   the first axis is parallel to an axis of a load for shaping one of the first and second bent portions, and the second axis is parallel to an axis of a load for shaping the other of the first and second bent portions and orthogonal to the first axis.

3. The conductor shaping apparatus according to claim 2, wherein
   one of the first and second shaping dies is configured to be moved away from the other of the first and second shaping dies along the second axis at the same time as the one of the first and second shaping dies is moved away from the other of the first and second shaping dies along the first axis after shaping of the first and second bent portions is completed.

4. The conductor shaping apparatus according to claim 2, wherein
   one of the first and second shaping dies is configured to be moved away from the other of the first and second shaping dies along the second axis before the one of the first and second shaping dies is moved away from the other of the first and second shaping dies along the first axis after shaping of the first and second bent portions is completed.

5. The conductor shaping apparatus according to claim 2, wherein one of the first and second shaping dies is a movable die that is advanceable and retractable along the first axis, and the other of the first and second shaping dies is a fixed die.

6. The conductor shaping apparatus according to claim 1, wherein
one of the first and second shaping dies is configured to be moved away from the other of the first and second shaping dies along the second axis at the same time as the one of the first and second shaping dies is moved away from the other of the first and second shaping dies along the first axis after shaping of the first and second bent portions is completed.

7. The conductor shaping apparatus according to claim 6, wherein
one of the first and second shaping dies is a movable die that is advanceable and retractable along the first axis, and the other of the first and second shaping dies is a fixed die.

8. The conductor shaping apparatus according to claim 1, wherein
one of the first and second shaping dies is configured to be moved away from the other of the first and second shaping dies along the second axis before the one of the first and second shaping dies is moved away from the other of the first and second shaping dies along the first axis after shaping of the first and second bent portions is completed.

9. The conductor shaping apparatus according to claim 8, wherein
one of the first and second shaping dies is a movable die that is advanceable and retractable along the first axis, and the other of the first and second shaping dies is a fixed die.

10. The conductor shaping apparatus according to claim 1, wherein
one of the first and second shaping dies is a movable die that is advanceable and retractable along the first axis, and the other of the first and second shaping dies is a fixed die.

11. The conductor shaping apparatus according to claim 10, further comprising:
a movable stage that is advanceable and retractable along the first axis, and that supports the movable die such that the movable die is turnable about a support shaft that extends in an axis that is orthogonal to both the first and second axes; and
a spring disposed between the movable die and the movable stage to urge the movable die away from the fixed die along the second axis, wherein
the movable die abuts against the conductor on a side proximate to the fixed die, in the second axis, with respect to a plane that includes an axis of the support shaft and that extends in the first axis as the movable die approaches the fixed die along the first axis.

12. The conductor shaping apparatus according to claim 11, wherein
a stroke of movement of the movable die with respect to the fixed die along the second axis is smaller than a thickness of the conductor in the second axis.

13. The conductor shaping apparatus according to claim 11, further comprising
a block that guides the movable die such that the movable die directly faces the fixed die.

14. The conductor shaping apparatus according to claim 10, further comprising:
a movable stage that is advanceable and retractable along the first axis, and that supports the movable die such that the movable die is movable in the second axis;
a spring disposed between the movable die and the movable stage to urge the movable die away from the fixed die along the second axis; and
a block that is advanceable and retractable along the first axis, and that guides the movable die such that the movable die approaches the fixed die along the second axis against an urging force of the spring as the movable stage approaches the fixed die along the first axis.

15. The conductor shaping apparatus according to claim 14, wherein:
the block includes a roller that is rotatable about an axis that extends in an axis that is orthogonal to both the first and second axes; and
the movable die abuts against the roller on a side proximate to the fixed die, in the second axis, with respect to a plane that includes an axis center of the roller and that extends in the first axis as the movable die approaches the fixed die along the first axis.

16. The conductor shaping apparatus according to claim 1, further comprising:
a third shaping die that is movable toward and away from one of the first and second shaping dies along the first axis, and that is capable of cooperating with one of the first and second shaping dies to shape the first bent portion that is the closest to a free end side of the conductor, wherein
the third shaping die is configured to be movable toward and away from one of the first and second shaping dies along the second axis.

17. The conductor shaping apparatus according to claim 1, wherein
the conductor has a rectangular cross section, the first bend axis is an edgewise axis that is orthogonal to a short side of the cross section of the conductor, the second bend axis is a flatwise axis that is orthogonal to a long side of the cross section of the conductor, the first bent portion is an edgewise bent portion that is bent in the edgewise axis, and the second bent portion is a flatwise bent portion that is bent in the flatwise axis.

18. The conductor shaping apparatus according to claim 1, wherein
the conductor is a lead wire portion that extends from one end of a coil.

19. A conductor shaping method for shaping at least one first bent portion and at least one second bent portion of a conductor that is bent in a first bend axis and a second bend axis that is orthogonal to the first bend axis, respectively, using first and second shaping dies that are movable toward and away from each other along a first axis, the conductor shaping method comprising the steps of:
moving the first and second shaping dies to approach each other along the first axis to shape the at least one first bent portion and the at least one second bent portion; and
moving one of the first and second shaping dies away from the other along a second axis that is different from the first axis such that the conductor is not dragged when the first and second shaping dies are moved away from each other along the first axis after shaping of the first and second bent portions is completed,
wherein, the first and second shaping dies are configured such that:

the first and second shaping dies approach each other along the first axis until the conductor abuts a first bending portion pressing surface of the second shaping die, the first and second shaping dies thereafter approach each other along the second axis until the conductor abuts a second bending portion pressing surface of the second shaping die, the first and second shaping dies thereafter approach along only the first axis to form the first and second bent portions, and the first and second shaping dies are moved away from each along only the second axis after shaping is complete.

20. A conductor shaping apparatus that shapes at least one first bent portion and at least one second bent portion of a conductor that is bent in a first bend axis and a second bend axis that is orthogonal to the first bend axis, respectively, the conductor shaping apparatus comprising first and second shaping dies that are movable toward and away from each other along a first axis, and that are moved toward each other to shape the at least one first bent portion and the at least one second bent portion,
wherein one of the first and second shaping dies is configured to be moved away from the other along a second axis that is different from the first axis such that the conductor is not dragged when the first and second shaping dies are moved away from each other along the first axis after shaping of the first and second bent portions is completed, and a third shaping die that is movable toward and away from one of the first and second shaping dies along the first axis, and that is capable of cooperating with one of the first and second shaping dies to shape the first bent portion that is the closest to a free end side of the conductor,
wherein the third shaping die is configured to be movable toward and away from one of the first and second shaping dies along the second axis.

21. A conductor shaping method for shaping at least one first bent portion and at least one second bent portion of a conductor that is bent in a first bend axis and a second bend axis that is orthogonal to the first bend axis, respectively, using first and second shaping dies that are movable toward and away from each other along a first axis and a third shaping die that is movable toward and away from one of the first and second shaping dies along the first axis, the conductor shaping method comprising the steps of:

moving the first and second shaping dies to approach each other along the first axis to shape the at least one first bent portion and the at least one second bent portion;

moving the third shaping die to approach one of the first and second shaping dies along the first axis to shape the first bent portion that is the closest to a free end side of the conductor, moving one of the first and second shaping dies away from the other along a second axis and moving the third shaping die away from the one of the first and second shaping dies along the second axis, the second axis is different from the first axis such that the conductor is not dragged when the first and second shaping dies are moved away from each other along the first axis after shaping of the first and second bent portions is completed.

* * * * *